US012794613B2

(12) United States Patent
Nam et al.

(10) Patent No.: US 12,794,613 B2
(45) Date of Patent: Nov. 10, 2026

(54) UPLINK BEAM DETERMINATION TECHNIQUES FOR SINGLE FREQUENCY NETWORK COMMUNICATIONS

(71) Applicant: QUALCOMM Incorporated, San Diego, CA (US)

(72) Inventors: Wooseok Nam, San Diego, CA (US); Fang Yuan, Beijing (CN); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 608 days.

(21) Appl. No.: 18/004,230

(22) PCT Filed: Aug. 25, 2020

(86) PCT No.: PCT/CN2020/111046

§ 371 (c)(1),
(2) Date: Jan. 4, 2023

(87) PCT Pub. No.: WO2022/040907

PCT Pub. Date: Mar. 3, 2022

(65) Prior Publication Data

US 2024/0171328 A1 May 23, 2024

(51) Int. Cl.
*H04L 5/00* (2006.01)
*H04B 7/06* (2006.01)

(52) U.S. Cl.
CPC ....... *H04L 5/0035* (2013.01); *H04B 7/06952* (2023.05); *H04L 5/0094* (2013.01)

(58) Field of Classification Search
CPC ..... H04B 7/024; H04L 5/0035; H04L 5/0051; H04L 5/0094; H04W 16/28; H04W 72/044; H04W 72/23; H04W 72/1268
(Continued)

(56) References Cited

U.S. PATENT DOCUMENTS 11,909,465 B2 * 2/2024 Matsumura ........... H04W 16/28
2018/0206132 A1 7/2018 Guo et al.
(Continued)

FOREIGN PATENT DOCUMENTS

CN 110446269 A 11/2019
CN 110475360 A 11/2019
(Continued)

OTHER PUBLICATIONS

Fraunhofer IIS, et al., "On Beam Management Enhancements for Multi-TRP", 3GPP TSG RAN WG1 Meeting #102-e, R1-2005784, 3rd Generation Partnership Project, Mobile Competence Centre, 650, Route Des Lucioles, F-06921 Sophia-Antipolis Cedex, France, vol. RAN WG1, No. E-meeting, Aug. 17, 2020-Aug. 28, 2020, Aug. 7, 2020, 3 Pages, XP051915039, Section 2.
(Continued)

*Primary Examiner* — Harun Chowdhury
(74) *Attorney, Agent, or Firm* — Holland & Hart LLP

(57) ABSTRACT

Methods, systems, and devices for wireless communications are described in which a base station may configure one or more UEs for single frequency network (SFN) communications that provide concurrent communications with a first transmission-reception point (TRP) and a second TRP in a first active bandwidth part (BWP) using a first uplink carrier. In cases where the SFN configuration does not provide an indication of a spatial relation or a path loss reference signal that is associated with the first active BWP, the UE and the TRPs may determine an associated first spatial relation or first path loss reference signal for the SFN communications based at least in part on the first active BWP and the SFN configuration. The UE may transmit uplink SFN communications to one or more TRPs using a beam that is determined based on the first spatial relation or first path loss reference signal.

8 Claims, 25 Drawing Sheets

(58) Field of Classification Search
USPC .................................................. 370/252, 329
See application file for complete search history.

(56) References Cited

U.S. PATENT DOCUMENTS

| | | | | |
|---|---|---|---|---|
| 2019/0141640 A1 | 5/2019 | Abedini et al. | | |
| 2020/0092860 A1 | 3/2020 | Khoshnevisan et al. | | |
| 2020/0120656 A1 | 4/2020 | Zhou et al. | | |
| 2022/0109541 A1* | 4/2022 | Cirik | H04W 72/23 | |
| 2022/0303788 A1* | 9/2022 | Zhang | H04W 16/28 | |
| 2022/0304018 A1* | 9/2022 | Ko | H04W 72/23 | |
| 2023/0078339 A1* | 3/2023 | Haghighat | H04B 7/024 | 370/329 |
| 2023/0171763 A1* | 6/2023 | Gao | H04W 72/23 | 370/329 |

FOREIGN PATENT DOCUMENTS

| | | |
|---|---|---|
| CN | 110535617 A | 12/2019 |
| CN | 111092707 A | 5/2020 |
| CN | 111434067 A | 7/2020 |
| CN | 111567123 A | 8/2020 |
| WO | WO-2020168322 A1 | 8/2020 |

OTHER PUBLICATIONS

Qualcomm Incorporated: “Multi-TRP Enhancements”, 3GPP TSG-RAN WG1 Meeting #99, R1-1912967, 3rd Generation Partnership Project (3GPP), Mobile Competence Centre, 650, Route Des Lucioles, F-06921 Sophia-Antipolis Cedex, France, vol. RAN WG1, No. Reno, Nevada, USA, Nov. 18, 2019-Nov. 22, 2019, Nov. 9, 2019, XP051823729, pp. 1-21, p. 1-p. 7, tables 1-5, p. 1, line 25-line 33, Sections 2 and 3.3.2.

Supplementary European Search Report—EP20950582—Search Authority—Munich—Mar. 28, 2024.

International Search Report and Written Opinion—PCT/CN2020/111046—ISA/EPO—May 26, 2021.

LG Electronics: “Discussions on UL Reference Signals for NR Positioning”, 3GPP TSG RAN WG1 #99, R1-1912273, Nov. 22, 2019 (Nov. 22, 2019), 8 Pages, sections 2 and 3.

Fraunhofer IIS, et al., “On Beam Management Enhancements for Multi-TRP”, 3GPP TSG RAN WG1 Meeting #102-e, R1-2005784, E-meeting, Aug. 17, 2020-Aug. 28, 2020, Aug. 8, 2020, 3 pages.

* cited by examiner

UPLINK BEAM DETERMINATION TECHNIQUES FOR SINGLE FREQUENCY NETWORK COMMUNICATIONS

CROSS REFERENCE

The present Application is a 371 national stage filing of International PCT Application No. PCT/CN2020/111046 by Nam et al. entitled "UPLINK BEAM DETERMINATION TECHNIQUES FOR SINGLE FREQUENCY NETWORK COMMUNICATIONS," filed Aug. 25, 2020, which is assigned to the assignee hereof, and which is expressly incorporated by reference in its entirety herein.

FIELD OF TECHNOLOGY

The following relates to wireless communications, including uplink beam determination techniques for single frequency network communications.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some deployments one or more base stations, such as a next generation or giga nodeB (gNB), may support communications using one or more transmission reception points (TRPs) to improve reliability, coverage, capacity performance, or combinations thereof. In some cases, a UE may establish beamformed communications links with multiple TRPs to simultaneously receive and transmit communications with the multiple TRPs. Further, in some cases multiple TRPs may transmit or receive communications concurrently according to a single frequency network (SFN) configuration. Efficient and reliable techniques for communications between a UE and multiple TRPs concurrently may be desirable to enhance network operation in such deployments.

SUMMARY

The described techniques relate to improved methods, systems, devices, and apparatuses that support uplink beam determination techniques for single frequency network (SFN) communications. In some aspects, a base station may configure a user equipment (UE) for SFN communications that provide concurrent communications with a first transmission-reception point (TRP) and a second TRP in a first active bandwidth part (BWP) using a first uplink carrier. In some cases, the SFN configuration may not provide an indication of a spatial relation or a path loss reference signal that is associated with the first active BWP. In some cases, the UE and the TRPs may determine an associated first spatial relation or first path loss reference signal for the SFN communications based at least in part on the first active bandwidth part and the SFN configuration. In some cases, the first spatial relation or first path loss reference signal may be determined based on configured transmission configuration indicator (TCI) codepoints or control resource sets (CORESETs) associated with the first active BWP.

In some cases, the first spatial relation or first path loss reference signal may be determined based on a TCI codepoint or a CORESET that has a lowest identification value that is mapped to a single TCI state. In other cases, the first spatial relation or first path loss reference signal may be determined based on a rule for TCI state selection based on the configured TCI codepoints or CORESETs that are associated with the SFN configuration. In further cases, the UE may select a single TRP for SFN communications (e.g., based on measured channel conditions), and may determine the first spatial relation or the first path loss reference signal based on the selected TRP. In other cases, the UE and TRPs may determine the first spatial relation or first path loss reference signal based on a single TCI state being associated with a lowest valued TCI codepoint identification or a lowest valued CORESET identification associated with the first active BWP, or based on a different TCI codepoint identification or a different CORESET identification that has two or more configured TCI states that is identified based on a rule for TCI state selection. The UE and TRPs may communicate using the SFN configuration via the first active BWP based at least in part on the first spatial relation or the first path loss reference signal.

DETAILED DESCRIPTION

Figure 1:
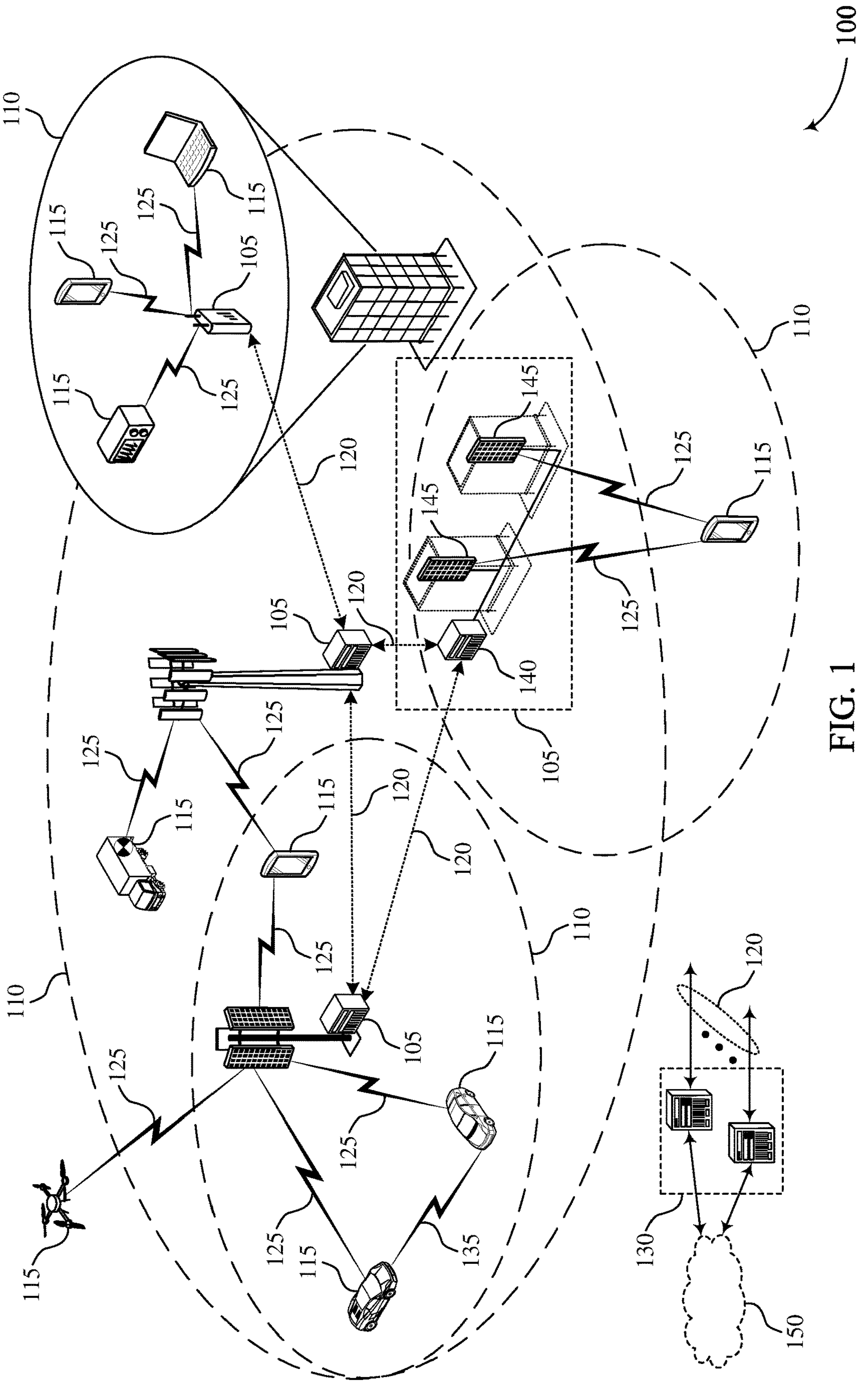
FIG. 1 illustrates an example of a system for wireless communications that supports uplink beam determination techniques for SFN communications in accordance with aspects of the present disclosure.

Various provided techniques relate to beam determination for SFN (SFN) communications using multiple TRPs (TRPs) in wireless communications. In some cases, a user equipment (UE) may be configured for SFN communications that provide concurrent communications with a first TRP (TRP) and a second TRP in a first active bandwidth part (BWP) using a first uplink carrier, where the SFN configuration does not provide an indication of an uplink beam that is associated with the first active BWP. In some cases, the uplink beam may be determined based at least in part on a spatial relation or a path loss reference signal that is associated with the first active BWP. In some cases, the UE and the TRPs may determine an associated first spatial relation or first path loss reference signal for the SFN communications based at least in part on the first active BWP and the SFN configuration. In some cases, the first spatial relation or first path loss reference signal may be determined based on configured transmission configuration indicator (TCI) codepoints or control resource sets (CORESETs) associated with the first active BWP. The UE may then transmit, and one or more TRPs may receive, uplink SFN communications based at least in part on the determined uplink beam.

In some cases, for non-SFN communications, a TRP and a UE may use a default beam for communications in cases where a particular beam is not configured. For example, a UE may be configured for dedicated uplink control channel or reference signal transmissions for a carrier (e.g., using physical uplink control channel (PUCCH) resources or sounding reference signal (SRS) resources) without a configured spatial relation and/or path loss reference signal to use for determination of an uplink transmission associated with the uplink communications. In other examples, a UE may be scheduled for an uplink data transmission (e.g., a physical uplink shared channel (PUSCH) transmission) on a carrier that does not have an associated uplink control channel (e.g., by a scheduling downlink control information (DCI) with format 0_0) or no configured uplink control channel has a configured spatial relation on the active uplink bandwidth part (BWP) in a frequency range that uses beamformed communications (e.g., an active uplink BWP that uses millimeter wave (mmW) frequencies).

For these types of scenarios, a default spatial relation and/or path loss reference signal may be determined based on whether any CORESETs are configured for a component carrier (CC) that us to be used for the uplink communications. In cases where one or more CORESET(s) are configured on the CC, a reference signal (e.g., a quasi co-location (QCL) type-D reference signal) of a TCI state or a QCL assumption of a CORESET with the lowest ID in the active BWP may serve as a default spatial relation and path loss reference signal. In cases where no CORESET is configured on the CC, a QCL reference signal (e.g., a QCL-TypeD reference signal) of an activated downlink channel (e.g., physical downlink shared channel (PDSCH)) TCI state with the lowest identification value (e.g., lowest TCI codepoint) in the active downlink BWP may serve as the default spatial relation and/or path loss reference signal. For example, a TCI state or QCL assumption may provide information about a path loss reference signal (e.g., a channel state information reference signal (CSI-RS) or a synchronization signal block (SSB)). By associating a certain downlink transmission (e.g., PDCCH or PDSCH TCI codepoint or CORESET ID) with a certain TCI state, the network may inform the UE that it can assume that the downlink transmission is done using the same spatial filter as the reference signal associated with that TCI state. Such a spatial filter may also be used to determine an uplink beam (e.g., uplink spatial filter) for uplink transmissions based on beam reciprocity.

While such default beam determinations may be provided for communications with a single TRP, in cases where multiple TRPs are configured for concurrent communications (e.g., in a SFN configuration) a CORESET or TCI codepoint may be mapped to two or more TCI states (e.g., different TCI states associated with different TRPs). As discussed herein, in cases where multiple TCI states are associated with a CORESET or TCI codepoint and a particular TCI state is not otherwise indicated with a configuration, various techniques described herein may be used to determine a spatial relation or path loss reference signal.

In such cases, a default TCI state for use in cases where a SFN configuration does not provide an indication of a spatial relation or path loss reference signal may be determined based on an active BWP for uplink SFN communications. In some cases, for SFN communications between a UE and multiple TRPs, a first spatial relation or first path loss reference signal may be determined for an active BWP based on a configured TCI codepoint or a CORESET that has a lowest identification value that is mapped to a single TCI state. In other cases, the first spatial relation or first path loss reference signal may be determined based on a rule for TCI state selection based on the configured TCI codepoints or CORESETs that are associated with the SFN configuration (e.g., a fixed selection of a first or second TCI state, a formula-based selection of TCI state, a TCI state that has a QCL-TypeD reference signal configuration, a TCI state whose QCL-TypeD RS has a higher RSRP, a predicted favorable TCI state, or any combinations thereof).

In further cases, the UE may select a single TRP for SFN communications (e.g., based on measured channel conditions), and may determine the first spatial relation or the first path loss reference signal based on the selected TRP. In other cases, the UE and TRPs may determine the first spatial relation or first path loss reference signal based on a single TCI state being associated with a lowest valued TCI codepoint identification or a lowest valued CORESET identification associated with the first active BWP, or based on a different TCI codepoint identification or a different CORESET identification that has two or more configured TCI states that is identified based on a rule for TCI state selection. The UE and TRPs may communicate using the SFN configuration via the first active BWP based at least in part on the determined first spatial relation or the first path loss reference signal.

Various aspects of the subject matter described herein may be implemented to realize one or more of the following potential advantages. The techniques employed by the described UEs and TRPs may provide benefits and enhancements to the operation of the UEs. For example, operations performed by the UEs may provide improvements to reliability and efficiency in receiving and transmitting communications with multiple TRPs based on a SFN configuration, in which the SFN configuration may not otherwise indicate a TCI state. Such techniques may be used to determine TCI state and thus associated beam for uplink communications in a reliable and unambiguous manner, which may allow both the UE and the TRPs to select corresponding beams for communications. The described techniques may thus include features for improvements to reliability in communications and enhanced communications efficiency.

Aspects of the disclosure are initially described in the context of wireless communications systems. Aspects of the disclosure are further illustrated by and described with reference to process flows, apparatus diagrams, system diagrams, and flowcharts that relate to uplink beam determination techniques for SFN communications.

FIG. 1 illustrates an example of a wireless communications system 100 that supports uplink beam determination techniques for SFN communications in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a BWP) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The network operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

In some cases, a base station 105 may configure one or more UEs 115 for SFN communications that provide concurrent communications with a first TRP and a second TRP (e.g., two TRPs associated with a same base station 105 or different base stations 105) in a first active BWP using a first uplink carrier. In some cases, the SFN configuration may not provide an indication of a spatial relation or a path loss reference signal that is associated with the first active BWP, and the UEs 115 and the TRPs may determine an associated first spatial relation or first path loss reference signal for the SFN communications based at least in part on the first active BWP and the SFN configuration.

Figure 2:
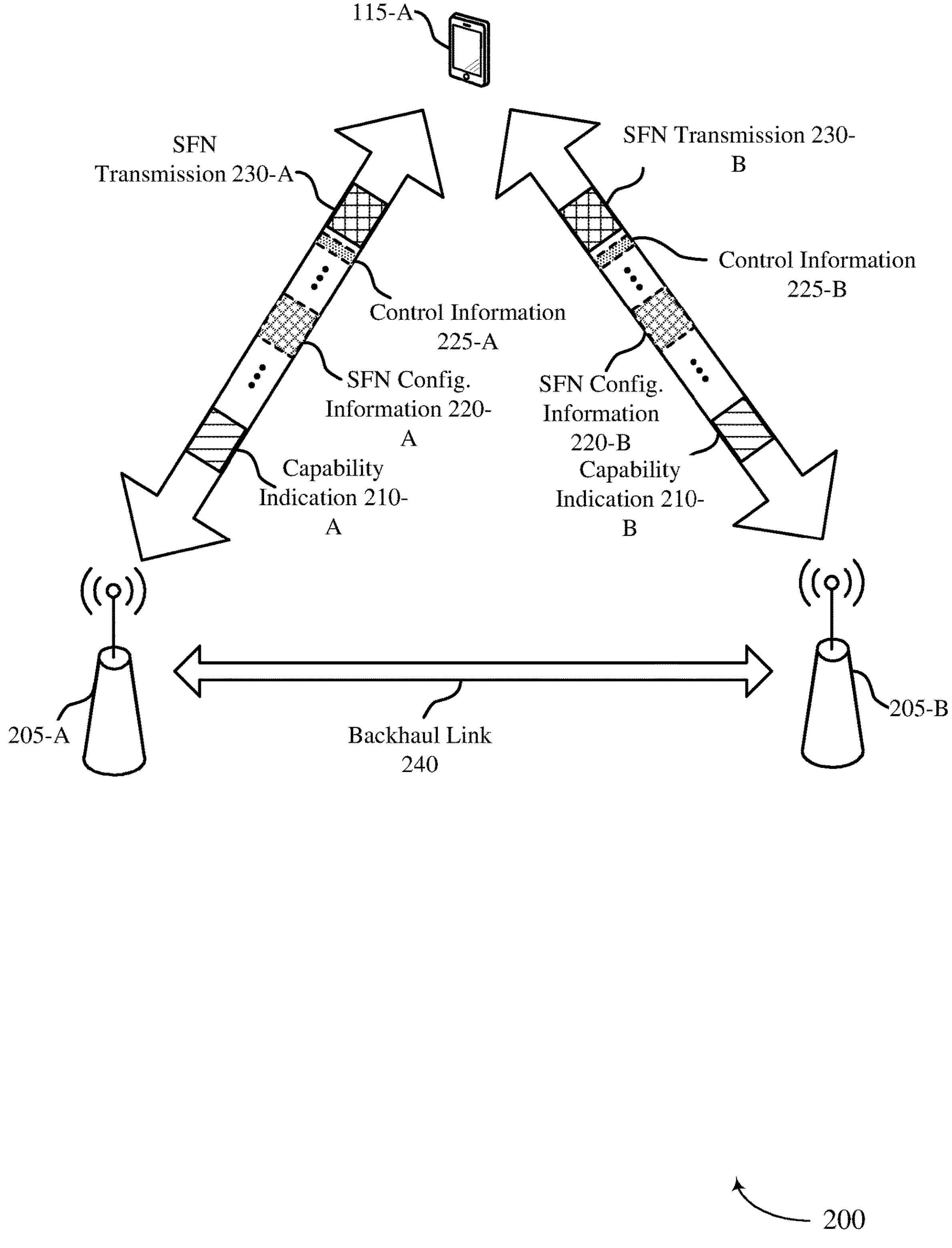
FIG. 2 illustrates an example of a portion of a wireless communications system that supports uplink beam determination techniques for SFN communications in accordance with aspects of the present disclosure.

FIG. 2 illustrates an example of a wireless communications system 200 that supports uplink beam determination techniques for SFN communications in accordance with aspects of the present disclosure. In some examples, wireless communications system 200 may implement aspects of wireless communications system 100. The wireless communications system 200 may include a UE 115-*a*, which may be an example of a UE 115 as described with reference to FIG. 1. Additionally, the wireless communications system 200 may include TRPs 205, which may be examples of access network transmission entities 145 as described with reference to FIG. 1. In wireless communications system 200, the UE 115-*a* may be configured to communicate with multiple TRPs 205 (e.g., TRP 205-*a* and TRP 205-*b*).

The UE 115-*a* may be in communication with one or more serving cells by the first TRP 205-*a* and the second TRP 205-*b*. In some cases, the UE 115-*a* may additionally be in communication with additional TRPs 205 associated with one or more serving cells. In some cases, the UE 115-*a* may optionally transmit a capability indication 210 to the TRPs 205 (e.g., a first capability indication 210-*a* that is transmitted to the first TRP 205-*a*, a second capability indication 210-*b* that is transmitted to the second TRP 205-*b*, or both). In some cases, the capability indication 210 may indicate the UE 115-*a* capability for supporting multiple TRP communications in which TCI codepoints or CORESETs may include multiple TCI states. In this example, the UE 115-*a* may receive one or more communications (e.g., via RRC signaling, MAC-CE signaling, DCI transmissions, or combinations thereof) that provide a SFN configuration information 220 (e.g., including first SFN configuration information 220-*a* from the first TRP 205-*a*, second SFN configuration information 220-*b* from the second TRP 205-*a*, or combinations thereof). In some cases, the SFN configuration information 220 may provide information for concurrent communications with multiple TRPs 205 using a same carrier. In some case, one or both of the TRPs 205 may provide control information 225, which may include first control information 225-*a* from the first TRP 205-*a*, second control information 225-*b* from the second TRP 205-*a*, or combinations thereof (e.g., each TRP 205 may transmit the same control information as part of a SFN downlink communication). In some cases, the control information 225 may provide a resource grant for one or more uplink SFN transmissions 230 (e.g., first SFN transmissions 230-*a* to the first TRP 205-*a*, second SFN transmissions 230-*b* to the second TRP 205-*a*, or combinations thereof). In some cases, the first TRP 205-*a* and the second TRP 205-*b* may be in communication with each other via a backhaul link 240 (e.g., via an X2, Xn, or other interface).

In accordance with various aspects of the present disclosure, the SFN configuration information 220 may include multiple TCI states per TCI codepoint and/or per CORESET, for concurrent communications with the first TRP 205-*a* and the second TRP 205-*b*. In some cases, the UE 115-*a* may be capable of receiving multiple concurrent beams (e.g., using multiple receive antenna panels), and may not be capable of transmitting two simultaneous beams (e.g., if the UE 115-*a* have a single transmit antenna panel). In such cases, if the CORESET of the lowest identification value in the active downlink BWP is mapped to a single TCI state when CORESET(s) are configured on the carrier, the UE 115-*a* may use the QCL-TypeD reference signal of the TCI state or QCL assumption of the CORESET with the lowest identification value in active BWP as the default spatial relation and/or path loss reference signal. In cases where a CORESET is not configured on the carrier and if the active TCI codepoint of the lowest identification value in the active downlink BWP is mapped to a single TCI state, the UE 115-*a* may use the QCL-TypeD reference signal of the activated PDSCH TCI state with the lowest ID (codepoint) in the active downlink-BWP as the default spatial relation and/or path loss reference signal.

Figure 3:
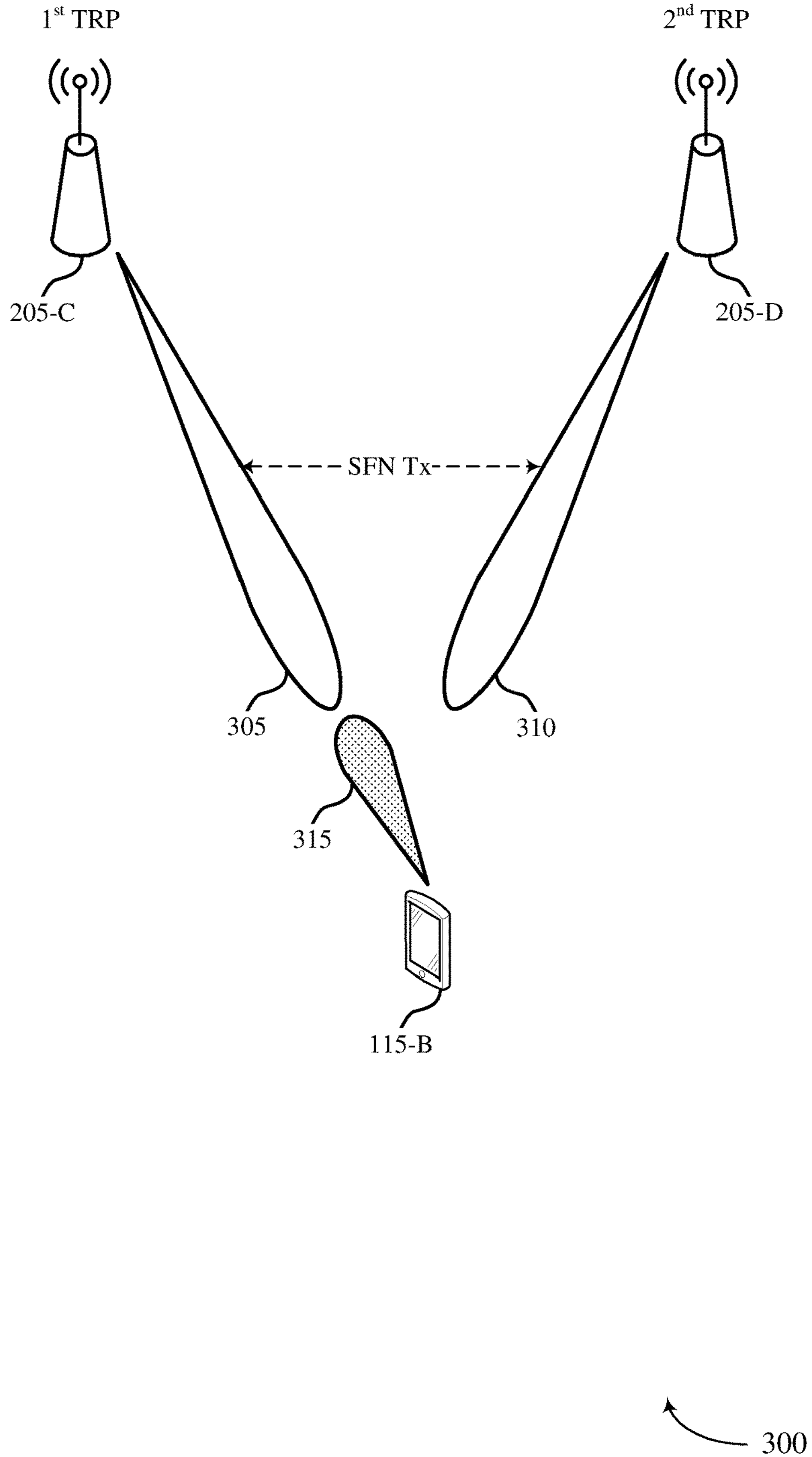
FIG. 3 illustrates an example of a multi-TRP configuration that supports uplink beam determination techniques for SFN communications in accordance with aspects of the present disclosure.
Figure 4:
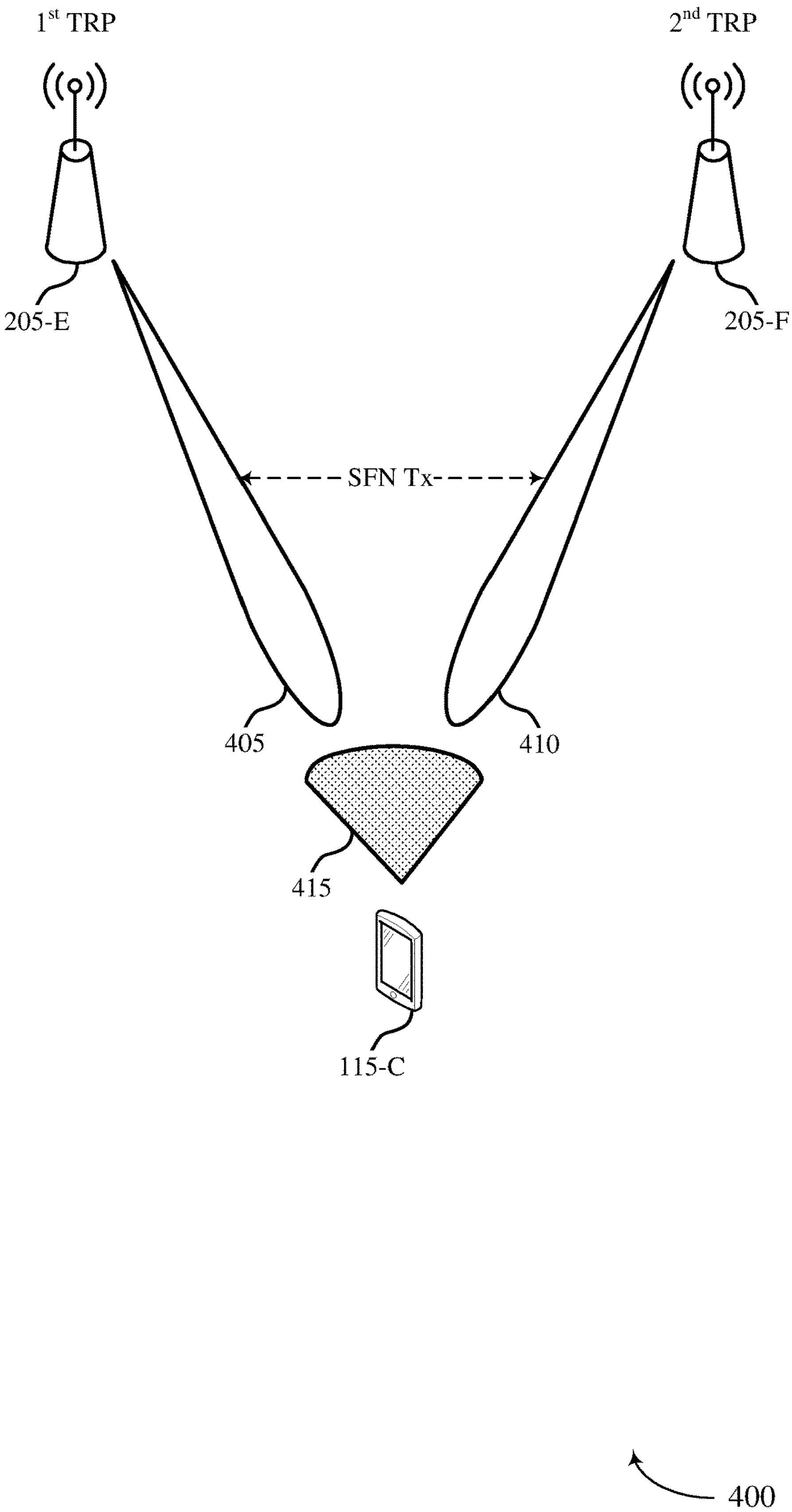
FIG. 4 illustrates an example of a multi-TRP configuration that supports uplink beam determination techniques for SFN communications in accordance with aspects of the present disclosure.

In cases where the CORESET or active TCI codepoint is the lowest identification value is mapped to two or more TCI states, the UE 115-*a* may, in some cases, select the lowest identification value among a subset of CORESETs or active TCI codepoints with only one TCI state configuration. In other cases, the UE 115-*a* may select one TCI state from the two or more TCI states based on a preconfigured rule. Such a rule may provide, for example, that the UE 115-*a* performs a fixed selection, such as always selecting a first or the second TCI state. In some cases, the TCI state to select may be configurable (e.g., by configuration information provided with the SFN configuration, with other RRC configuration information, via a MAC-CE or DCI, or any combinations thereof). In some cases, the selection of the TCI state from the two or more TCI states may be based on a rule or formula that depends on one or more parameters associated with the UE 115-*a* (e.g., UE ID, PUCCH/SRS resource ID, power control loop ID, etc.). In some cases, the UE 115-*a* may select a TCI that is associated with a QCL-TypeD reference signal, if only one of the TCI states has a QCL-TypeD reference signal configuration. In cases where multiple TCI states have a QCL-TypeD reference signal, the UE 115-*a* may select the TCI state whose QCL-TypeD RS has a higher reference signal received power (RSRP). In further cases, the UE 115-*a* may select the TCI state based on a UE prediction or a predetermined TCI pattern (e.g., based on a periodic time-varying pattern of RSRPs, RSRP variation based on UE 115-*a* position, etc.). In other cases, the UE 115-*a* may use the two or more TCI states and time division multiplex (TDM) uplink communications across the two or more TCI states. FIGS. 3 and 4 illustrate two examples of SFN communications between a UE 115 and two TRPs 205.

In some cases, the UE 115-*a* may be capable of two simultaneous beam transmissions (e.g., if the UE 115-*a* includes multiple antenna panels that can be used for uplink communications), which may be indicated with the capability indication 210. In some cases, even though the UE 115-*a* may have multiple antenna panels that may be used for uplink communications, the UE 115-*a* may be constrained to use only a single panel (e.g., due to thermal constraints, maximum permissible exposure (MPE) constraints, etc.). In cases where the UE 115-*a* can transmit multiple concurrent uplink beams as part of a SFN configuration, the UE may determine a TCI state (e.g., based on spatial relation, path loss reference signal, or combinations thereof) based on the active downlink BWP. In some cases, if the CORESET or the active TCI codepoint of the lowest valued identification in the active downlink BWP is mapped to a single TCI state, the UE 115-*a*, when CORESET(s) are configured on the carrier, may use the QCL-TypeD reference signal of the TCI state or QCL assumption of the CORESET with the lowest identification value in active BWP as the default spatial relation and/or path loss reference signal. The default spatial relation and/or path loss reference signal may be applied to one or both of the uplink panels. In cases where a CORESET is not configured on the carrier and the active TCI codepoint of the lowest valued identification in the active downlink BWP is mapped to a single TCI state, the UE 115-*a* may use the QCL-TypeD reference signal of the activated PDSCH TCI state with the lowest ID (codepoint) in the active downlink-BWP as the default spatial relation and/or path loss reference signal. The default spatial relation and/or path loss reference signal may be applied to one or both of the uplink panels. In other cases, if the CORESET or the active TCI codepoint of the lowest valued identification in the active downlink BWP is mapped to multiple TCI states, the UE 115-*a* may use the two (or more) TCI states for a default uplink beam and path loss reference signal for two uplink panels (e.g., one for each uplink transmit antenna panel). If at least one of the CORESETs or at least one of the active TCI codepoints in the active downlink BWP is mapped to multiple TCI states, the UE 115-*a* may select the lowest identification value among a subset of CORESETs or active TCI codepoints with two or more TCI states configured for the default uplink beams and path loss reference signals of two uplink panels (e.g., one for each uplink transmit antenna panel).

FIG. 3 illustrates an example of a multi-TRP configuration for a wireless communications system 300 that supports uplink beam determination techniques for SFN communications in accordance with aspects of the present disclosure. In some examples, multi-TRP configuration may implement aspects of wireless communications systems 100 or 200. The wireless communications system 300 may include a UE 115-*b*, which may be an example of a UE 115 as described with reference to FIG. 1 or 2. Additionally, the wireless communications system 300 may include TRPs 205, which may be examples of access network transmission entities 145 as described with reference to FIG. 1. In wireless communications system 300, the UE 115-*b* may be configured to communicate with multiple TRPs 205 (e.g., TRP 205-*c* and TRP 205-*d*).

In this example, the first TRP 205-*c* may have an associated first beam 305 that is associated with a first spatial relation and first path loss reference signal. Similarly, the second TRP 205-*d* may have an associated second beam 310 that is associated with a second spatial relation and a second path loss reference signal. In this example, the UE 115-*b* may be capable of transmitting a single uplink transmission beam, which may be determined based on techniques as discussed with respect to FIG. 2. In some cases, the UE 115-*b* may determine that a first uplink beam 315 is to be used for uplink communications, based on selection of the first spatial relation and the first path loss reference signal. In some cases, for downlink SFN communications, the UE 115-*b* may utilize the two TCI states to determine its downlink receive beams (e.g., using multiple antenna panels) to receive communications on the first beam 305 and the second beam 310. Based on the UE 115-*b* capability of a single uplink beam, a single TRP 205 may be selected for uplink communications (or the UE 115-*b* may TDM communications to the TRPs 205). In some cases, the UE 115-*b* may determine an uplink beam 315 based on determination of a spatial relation and/or path loss reference signal using techniques such as discussed with reference to FIG. 2. Thus, in this example, the two TRPs 205 may transmit downlink SFN and receive uplink communications based on the SFN configuration. In some cases, each TRP 205 may not have any knowledge on the UE 115-*b* uplink beam selection, and may monitor uplink resources according to the SFN configuration. Thus, the UE 115-*b* may choose to transmit to only one TRP, thus providing selection diversity which may help to enhance the reliability of communications (e.g., through UE 115-*b* selection of a TRP 205 having more favorable channel conditions or associated RSRP values).

FIG. 4 illustrates an example of a multi-TRP configuration for a wireless communications system 400 that supports uplink beam determination techniques for SFN communications in accordance with aspects of the present disclosure. In some examples, multi-TRP configuration may implement aspects of wireless communications systems 100 or 200. The wireless communications system 400 may include a UE 115-*c*, which may be an example of a UE 115 as described with reference to FIG. 1 or 2. Additionally, the wireless communications system 400 may include TRPs 205, which may be examples of access network transmission entities 145 as described with reference to FIG. 1. In wireless communications system 400, the UE 115-*c* may be configured to communicate with multiple TRPs 205 (e.g., TRP 205-*e* and TRP 205-*f*).

In this example, the first TRP 205-*e* may have an associated first beam 405 that is associated with a first spatial relation and first path loss reference signal. Similarly, the second TRP 205-*f* may have an associated second beam 410 that is associated with a second spatial relation and a second path loss reference signal. In this example, the UE 115-*c* again may be capable of transmitting a single uplink transmission beam, and a CORESET of active TCI codepoint may have two TCI states. In this example, the UE 115-*c* may use both TCI states to form a different receive beam 415 from that of a single-TRP receive beam. The different receive beam 415 may be, for example, a wider or composite beam that spans the first beam 405 and the second beam 410. In other cases, similarly as discussed with reference to FIG. 3, the UE 115-*c* may use multiple receive beams for multiple receive antenna panels. In some cases, the UE 115-*c* may use the composite or wide beam parameters for uplink communications to the TRPs 205 in a SFN configuration, or the UE 115-*c* may select one TCI state for an uplink beam such as discussed with reference to FIG. 3.

Figure 5:
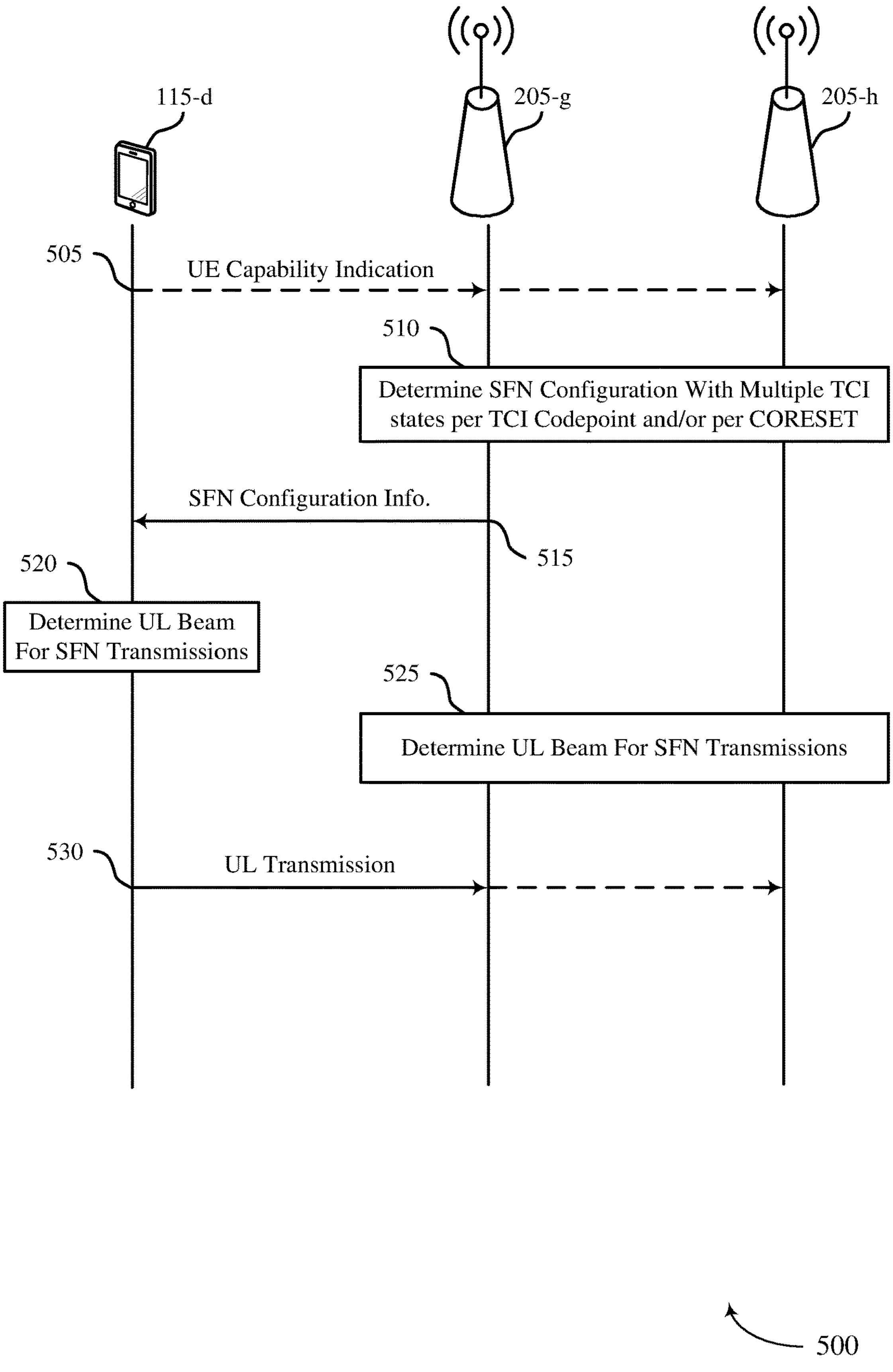
FIG. 5 illustrates an example of a process flow that supports uplink beam determination techniques for SFN communications in accordance with aspects of the present disclosure.

FIG. 5 illustrates an example of a process flow 500 that supports uplink beam determination techniques for SFN communications in accordance with aspects of the present disclosure. In some examples, process flow 500 may implement aspects of wireless communications systems 100 through 400. Process flow may include a UE 115-*d*, a first TRP 205-*g*, and a second TRP 205-*h*, which may each be examples of UEs and TRPs as described with reference to FIGS. 1 through 4. Additionally, TRPs 205 may be a part of a same base station (or serving cell), or be associated with different base stations, that may be examples a base station as described with reference to FIG. 1.

At 505, the UE 115-*d* may optionally transmit a UE capability indication to the first TRP 205-*g*, to the second TRP 205-*h*, or both. The UE capability indication may indicate that the UE 115-*d* is capable of multiple concurrent uplink communications using different beams according to a SFN configuration, for example. In some cases, the UE capability indication may indicate that the UE 115-*d* is capable of receiving multiple concurrent downlink transmissions via different downlink beams (based on different downlink TCI states), but is capable of only a single uplink beam transmission at a time. In further, cases, the capability indication may indicate that the UE 115-*d* is capable of receiving and transmitting on multiple concurrent beams (e.g., using multiple transmit antenna panels and multiple receive antenna panels).

At 510, the TRPs 205 may determine a SFN configuration with multiple TCI states per TCI codepoint and/or per CORESET for one or more configured TCI codepoints or CORESETs. At 515, in this example, the first TRP 205-*g* may transmit SFN configuration information to the UE 115-*d*. In other cases, the second TRP 205-*g* may transmit the SFN configuration information, or both TRPs 205 may transmit all or a portion of the SFN configuration information.

At 520, the UE 115-*d* may determine an uplink beam for SFN transmissions. The UE 115-*d* may determine the uplink beam using techniques such as discussed herein with reference to FIGS. 2 through 4, for example. At 525, the TRPs 205 may also determine the uplink beam for SFN transmissions, in accordance with techniques as discussed herein. At 530, the UE 115-*d* may transmit the uplink transmission to one or both of the TRPs 205 based on the determined uplink beam.

Figure 6:
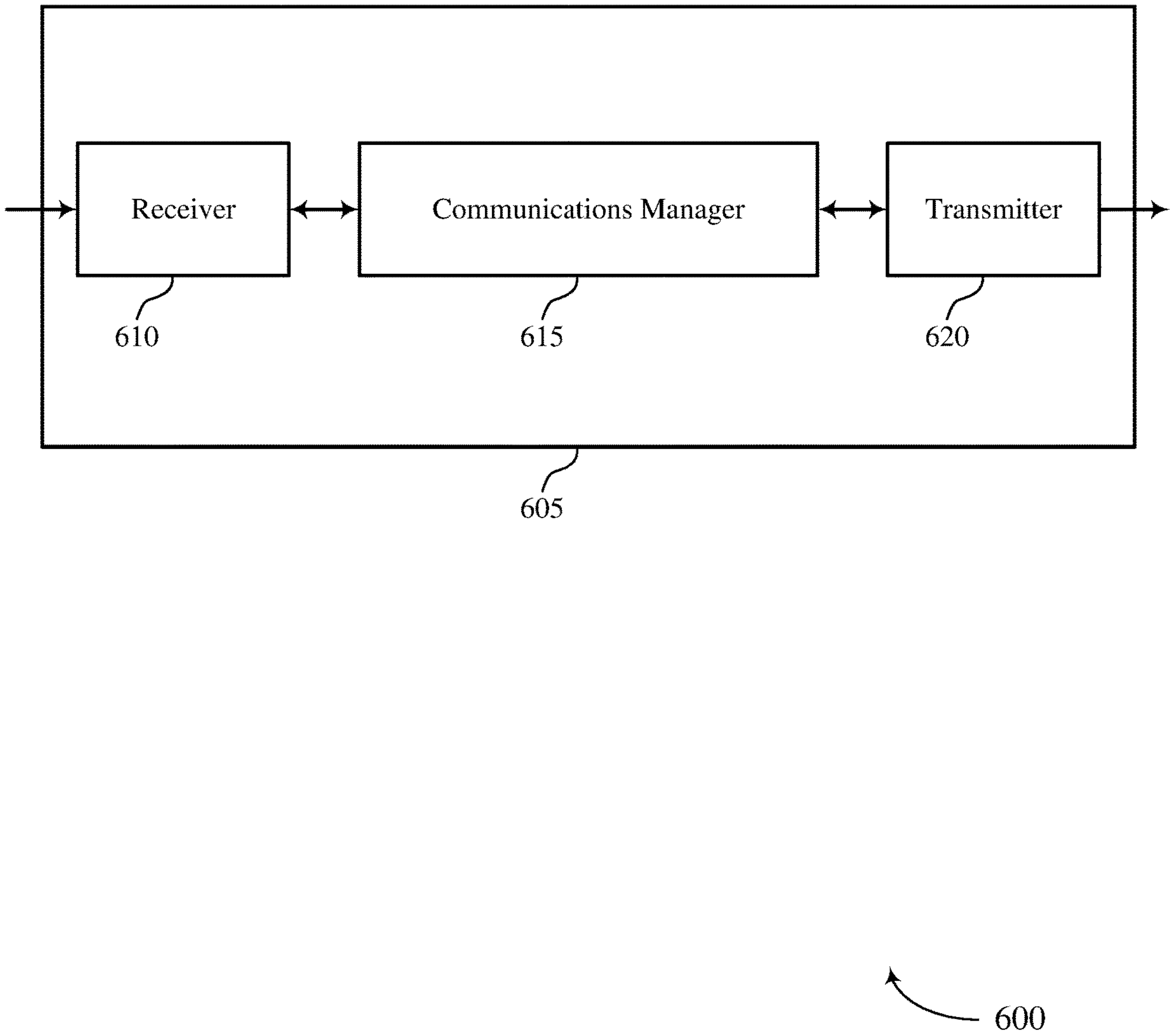
FIGS. 6 and 7 show block diagrams of devices that support uplink beam determination techniques for SFN communications in accordance with aspects of the present disclosure.

FIG. 6 shows a block diagram 600 of a device 605 that supports uplink beam determination techniques for SFN communications in accordance with aspects of the present disclosure. The device 605 may be an example of aspects of a UE 115 as described herein. The device 605 may include a receiver 610, a communications manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to uplink beam determination techniques for SFN communications, etc.). Information may be passed on to other components of the device 605. The receiver 610 may be an example of aspects of the transceiver 920 described with reference to FIG. 9. The receiver 610 may utilize a single antenna or a set of antennas.

The communications manager 615 may receive, from a first TRP, a SFN configuration for concurrent communications with at least the first TRP and a second TRP using a first uplink carrier in a first active BWP, where one or more of an indication of a spatial relation or a path loss reference signal of a set of available spatial relations or path loss reference signals is absent from the SFN configuration, determine one or more of a first spatial relation or a first path loss reference signal for a SFN communication based on the first active BWP and the SFN configuration, and transmit the SFN communication to one or more of the first TRP or the second TRP via the first active BWP based on the first spatial relation or the first path loss reference signal. The communications manager 615 may be an example of aspects of the communications manager 910 described herein.

The communications manager 615 may as described herein be implemented to realize one or more potential advantages. One implementation may allow the device 605 to unambiguously determine an uplink beam for uplink communications in a SFN configuration with multiple TRPs. Such uplink beam determination may allow for selection of a TCI state for use in transmitting and receiving SFN communications that provides a higher likelihood of successful reception of such communications. Further, implementations may allow the device 605 to increase communications reliability, throughput, and enhance user experience, while reducing overall power consumption, among other advantages.

The communications manager 615, or its sub-components, may be implemented in hardware, code (e.g., software or firmware) executed by a processor, or any combination thereof. If implemented in code executed by a processor, the functions of the communications manager 615, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 615, or its sub-components, may be physically located at various positions, including being distributed such that portions of functions are implemented at different physical locations by one or more physical components. In some examples, the communications manager 615, or its sub-components, may be a separate and distinct component in accordance with various aspects of the present disclosure. In some examples, the communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 620 may transmit signals generated by other components of the device 605. In some examples, the transmitter 620 may be collocated with a receiver 610 in a transceiver module. For example, the transmitter 620 may be an example of aspects of the transceiver 920 described with reference to FIG. 9. The transmitter 620 may utilize a single antenna or a set of antennas.

Figure 7:
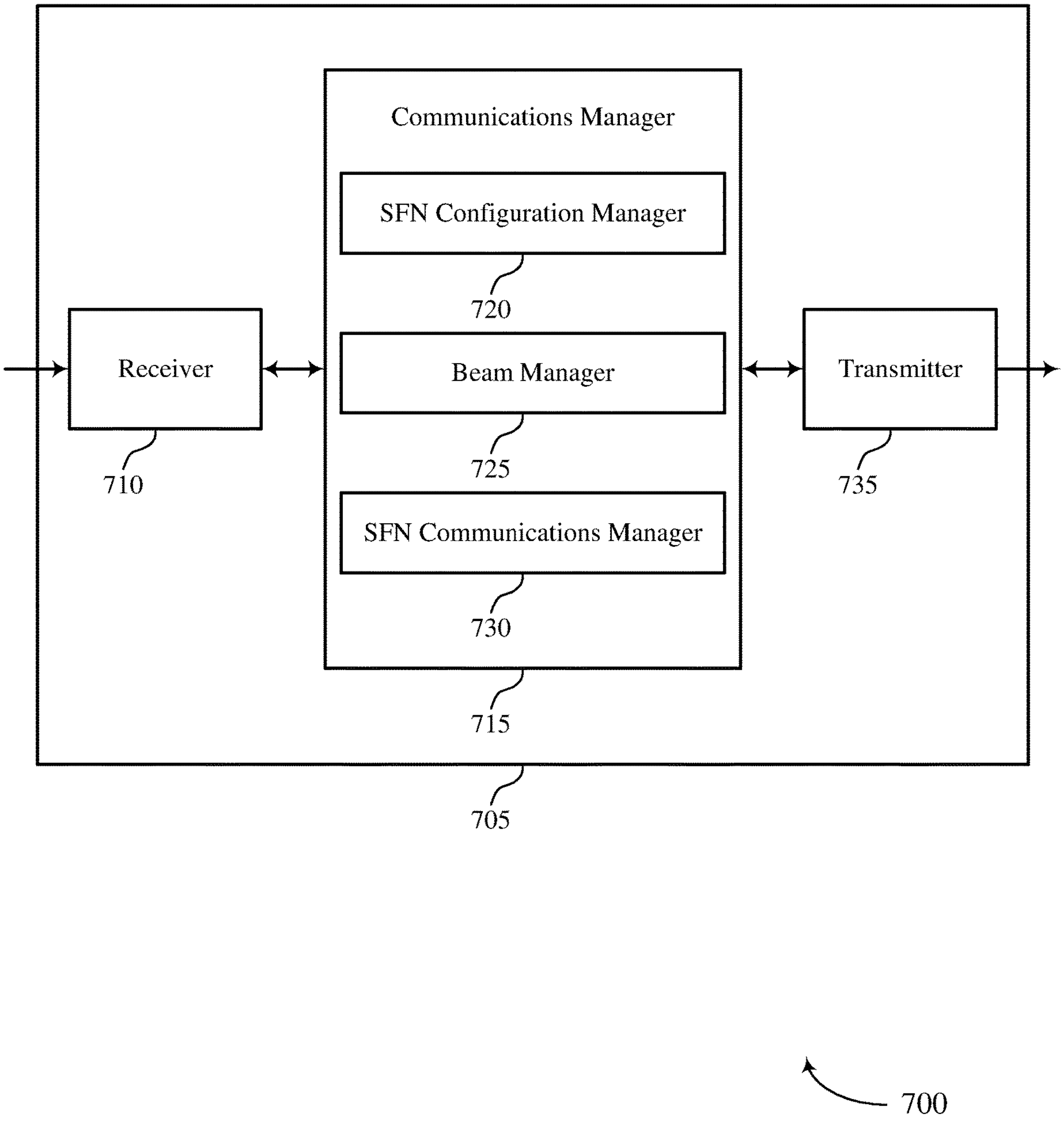

FIG. 7 shows a block diagram 700 of a device 705 that supports uplink beam determination techniques for SFN communications in accordance with aspects of the present disclosure. The device 705 may be an example of aspects of a device 605, or a UE 115 as described herein. The device 705 may include a receiver 710, a communications manager 715, and a transmitter 735. The device 705 may also include a processor. Each of these components may be in communication with one another (e.g., via one or more buses).

The receiver 710 may receive information such as packets, user data, or control information associated with various information channels (e.g., control channels, data channels, and information related to uplink beam determination techniques for SFN communications, etc.). Information may be passed on to other components of the device 705. The receiver 710 may be an example of aspects of the transceiver 920 described with reference to FIG. 9. The receiver 710 may utilize a single antenna or a set of antennas.

The communications manager 715 may be an example of aspects of the communications manager 615 as described herein. The communications manager 715 may include a SFN configuration manager 720, a beam manager 725, and a SFN communications manager 730. The communications manager 715 may be an example of aspects of the communications manager 910 described herein.

The SFN configuration manager 720 may receive, from a first TRP, a SFN configuration for concurrent communications with at least the first TRP and a second TRP using a first uplink carrier in a first active BWP, where one or more of an indication of a spatial relation or a path loss reference signal of a set of available spatial relations or path loss reference signals is absent from the SFN configuration.

The beam manager 725 may determine one or more of a first spatial relation or a first path loss reference signal for a SFN communication based on the first active BWP and the SFN configuration.

The SFN communications manager 730 may transmit the SFN communication to one or more of the first TRP or the second TRP via the first active BWP based on the first spatial relation or the first path loss reference signal.

The transmitter 735 may transmit signals generated by other components of the device 705. In some examples, the transmitter 735 may be collocated with a receiver 710 in a transceiver module. For example, the transmitter 735 may be an example of aspects of the transceiver 920 described with reference to FIG. 9. The transmitter 735 may utilize a single antenna or a set of antennas.

Figure 8:
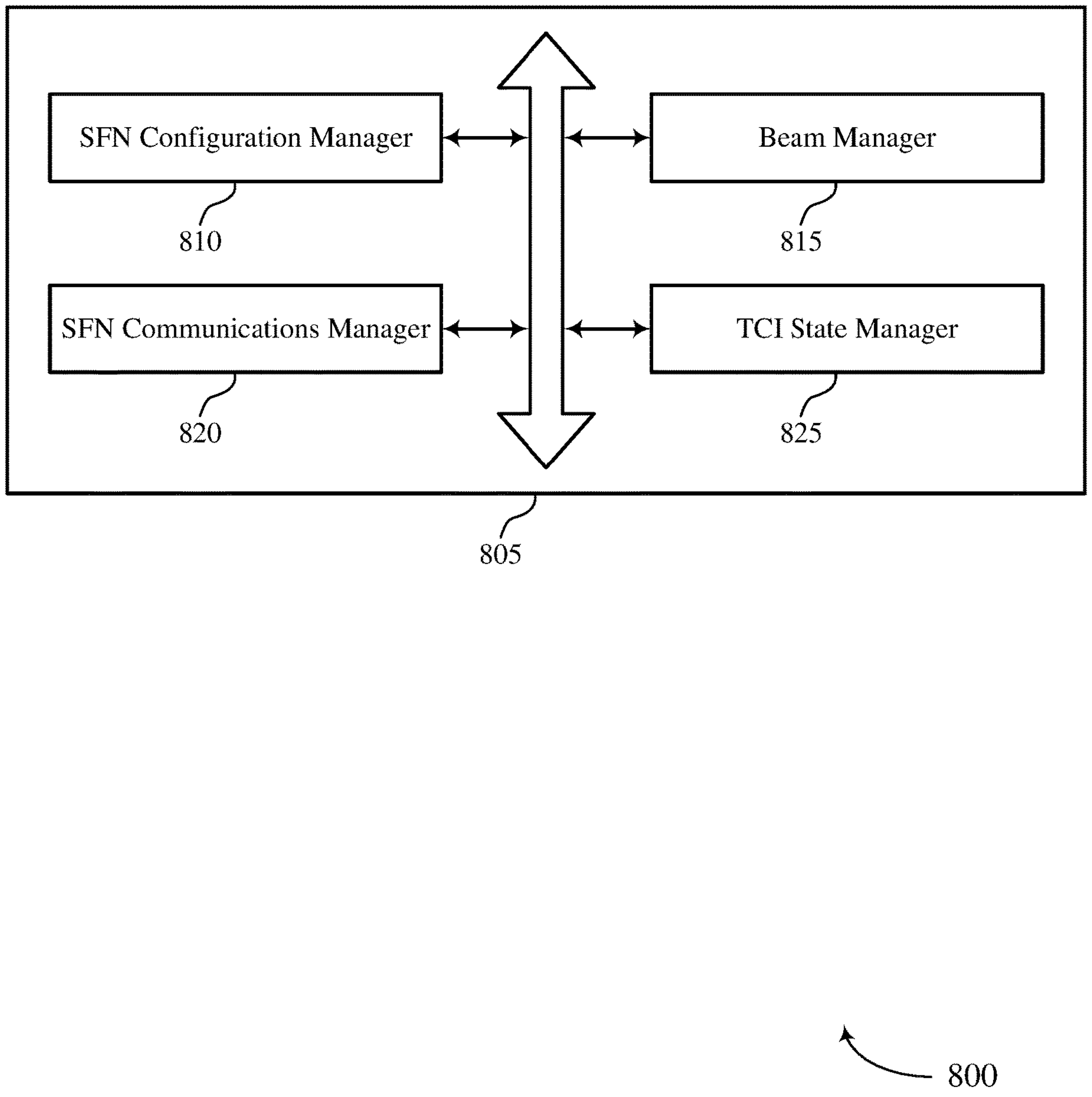
FIG. 8 shows a block diagram of a communications manager that supports uplink beam determination techniques for SFN communications in accordance with aspects of the present disclosure.

FIG. 8 shows a block diagram 800 of a communications manager 805 that supports uplink beam determination techniques for SFN communications in accordance with aspects of the present disclosure. The communications manager 805 may be an example of aspects of a communications manager 615, a communications manager 715, or a communications manager 910 described herein. The communications manager 805 may include a SFN configuration manager 810, a beam manager 815, a SFN communications manager 820, and a TCI state manager 825. Each of these modules may communicate, directly or indirectly, with one another (e.g., via one or more buses).

The SFN configuration manager 810 may receive, from a first TRP, a SFN configuration for concurrent communications with at least the first TRP and a second TRP using a first uplink carrier in a first active BWP, where one or more of an indication of a spatial relation or a path loss reference signal of a set of available spatial relations or path loss reference signals is absent from the SFN configuration.

The beam manager 815 may determine one or more of a first spatial relation or a first path loss reference signal for a SFN communication based on the first active BWP and the SFN configuration. In some examples, the beam manager 815 may receive, from the first TRP, one or more TCI states for each of a set of configured TCI codepoints or CORESETs associated with the first active BWP, each of the one or more configured TCI codepoints or CORESETs having as associated identification value.

In some examples, the beam manager 815 may determine that a first TCI codepoint or a first CORESET having a lowest identification value is mapped to a single TCI state. In some examples, the beam manager 815 may determine one or more of the first spatial relation or the first path loss reference signal based on the first TCI codepoint or the first CORESET.

In some examples, the beam manager 815 may identify a set of available TCI states associated with a set of configured TCI codepoints or CORESETs of the first active BWP, where each TCI state of the set of TCI states has one or more of an associated spatial relation or an associated path loss reference signal. In some examples, the beam manager 815 may determine a first TCI state based on a rule for TCI state selection, where the first spatial relation and the first path loss reference signal are associated with the first TCI state.

In some examples, the beam manager 815 may select the first TRP or the second TRP to receive at least a first SFN communication. In some examples, the beam manager 815 may determine the first spatial relation or the first path loss reference signal associated with the selected TRP. In some examples, the beam manager 815 may determine a composite beam based on a first TCI state associated with the first TRP and a second TCI state associated with the second TRP. In some examples, the beam manager 815 may determine one or more of the first spatial relation or the first path loss reference signal based on the composite beam.

The SFN communications manager 820 may transmit the SFN communication to one or more of the first TRP or the second TRP via the first active BWP based on the first spatial relation or the first path loss reference signal. In some examples, the SFN communications manager 820 may time division multiplex the one or more SFN communications across two or more TCI states that are configured for a TCI codepoint or CORESET having a lowest associated identification value.

In some examples, the TCI state manager 825 may determine that a single TCI state is associated with a lowest valued TCI codepoint identification or a lowest valued CORESET identification associated with the first active BWP. In some examples, the TCI state manager 825 may determine one or more of the first spatial relation or the first path loss reference signal based on the single TCI state. In some examples, the TCI state manager 825 may determine that a single TCI state is associated with a lowest valued TCI codepoint identification or a lowest valued CORESET identification associated with the first active BWP.

In some examples, the TCI state manager 825 may identify a different TCI codepoint identification or a different CORESET identification that has two or more configured TCI states. In some examples, the TCI state manager 825 may determine, based on the different TCI codepoint identification of the different CORESET identification, a first TCI state associated with the first TRP and a second TCI state associated with the second TRP. In some examples, the transmitting includes transmitting a first SFN communication to the first TRP based on the first TCI state and transmitting a second SFN communication to the second TRP based on the second TCI state.

In some examples, the TCI state manager 825 may determine that two or more TCI states are associated with a lowest valued TCI codepoint identification or a lowest valued CORESET identification associated with the first active BWP. In some examples, the TCI state manager 825 may determine, based on the two or more TCI states, a first TCI state associated with the first TRP and a second TCI state associated with the second TRP. In some cases, the first TCI state is determined based on a lowest active TCI codepoint or CORESETs that has only one configured TCI state, a fixed selection from a set of TCI states, a relationship between one or more of a UE identification, a configured uplink resource identification, a power control loop identification, a type of reference signal associated with each of the set of TCI states, a RSRP associated with each of the set of TCI states, an expected channel quality associated with each of the set of TCI states, or any combinations thereof.

Figure 9:
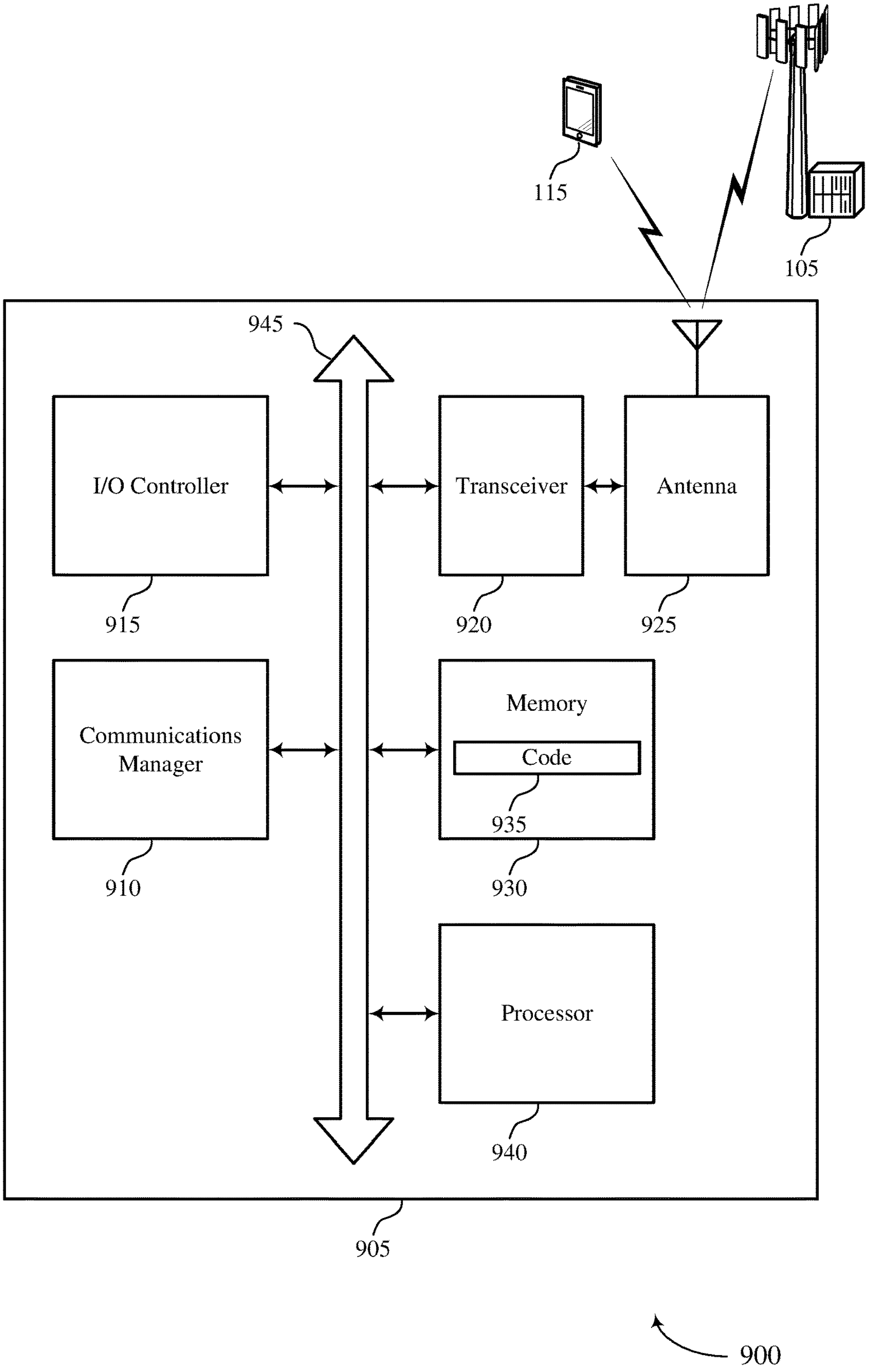
FIG. 9 shows a diagram of a system including a device that supports uplink beam determination techniques for SFN communications in accordance with aspects of the present disclosure.

FIG. 9 shows a diagram of a system 900 including a device 905 that supports uplink beam determination techniques for SFN communications in accordance with aspects of the present disclosure. The device 905 may be an example of or include the components of device 605, device 705, or a UE 115 as described herein. The device 905 may include components for bi-directional voice and data communications including components for transmitting and receiving communications, including a communications manager 910, an I/O controller 915, a transceiver 920, an antenna 925, memory 930, and a processor 940. These components may be in electronic communication via one or more buses (e.g., bus 945).

The communications manager 910 may receive, from a first TRP, a SFN configuration for concurrent communications with at least the first TRP and a second TRP using a first uplink carrier in a first active BWP, where one or more of an indication of a spatial relation or a path loss reference signal of a set of available spatial relations or path loss reference signals is absent from the SFN configuration, determine one or more of a first spatial relation or a first path loss reference signal for a SFN communication based on the first active BWP and the SFN configuration, and transmit the SFN communication to one or more of the first TRP or the second TRP via the first active BWP based on the first spatial relation or the first path loss reference signal.

The communications manager 910 may as described herein be implemented to realize one or more potential advantages. One implementation may allow the device 905 to unambiguously determine an uplink beam for uplink communications in a SFN configuration with multiple TRPs. Such uplink beam determination may allow for selection of a TCI state for use in transmitting and receiving SFN communications that provides a higher likelihood of successful reception of such communications. Further, implementations may allow the device 905 to increase communications reliability, throughput, and enhance user experience, while reducing overall power consumption, among other advantages.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described above. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the wireless device may include a single antenna 925. However, in some cases the device may have more than one antenna 925, which may be capable of concurrently transmitting or receiving multiple wireless transmissions.

The memory 930 may include RAM and ROM. The memory 930 may store computer-readable, computer-executable code 935 including instructions that, when executed, cause the processor to perform various functions described herein. In some cases, the memory 930 may contain, among other things, a BIOS which may control basic hardware or software operation such as the interaction with peripheral components or devices.

The processor 940 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting uplink beam determination techniques for SFN communications).

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

Figure 10:
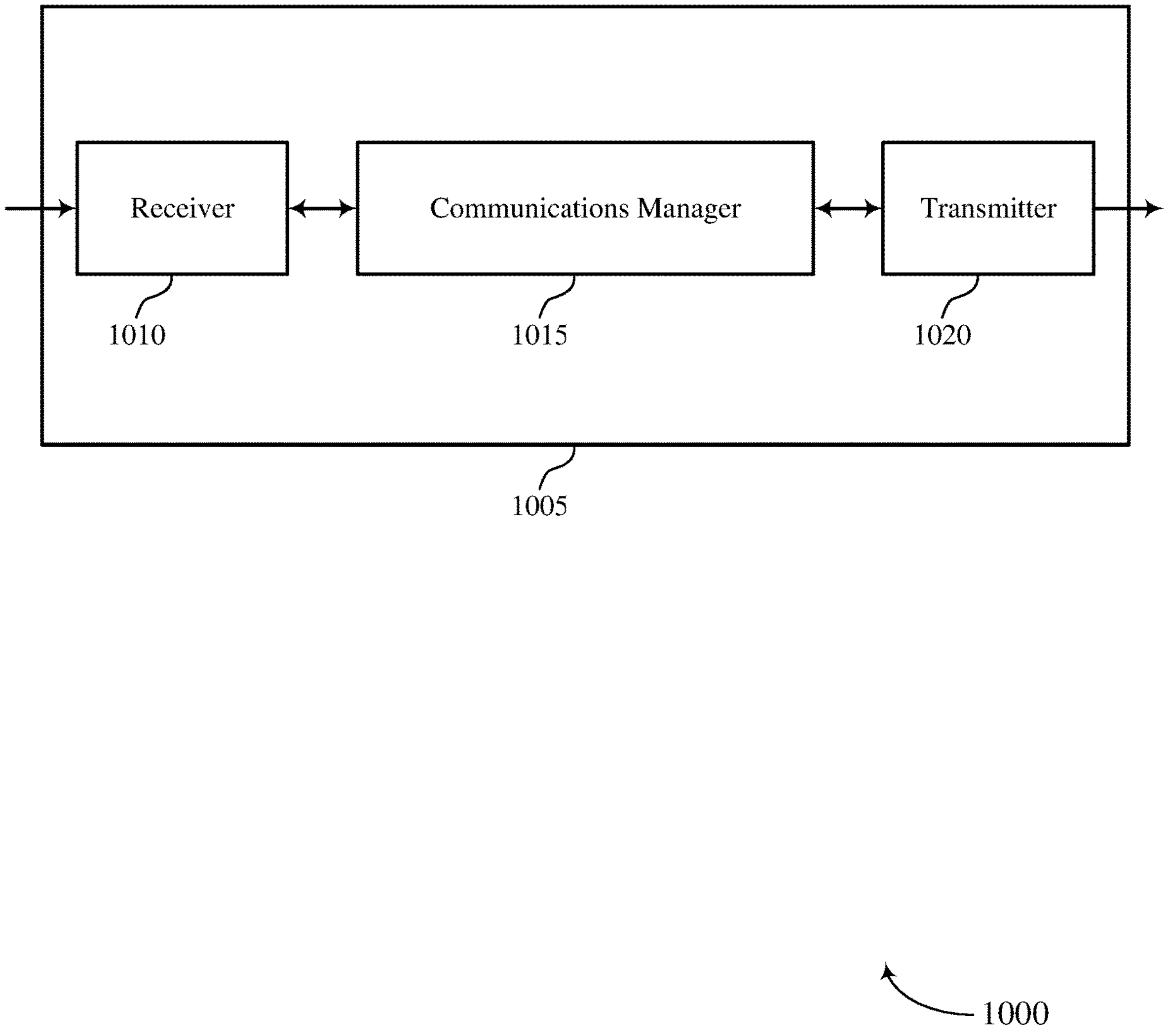
FIGS. 10 and 11 show block diagrams of devices that support uplink beam determination techniques for SFN communications in accordance with aspects of the present disclosure.

FIG. 10 shows a block diagram 1000 of a device 1005 that supports uplink beam determination techniques for SFN communications in accordance with aspects of the present disclosure. The device 1005 may be an example of aspects of a base station 105 as described herein. The device 1005 may include a receiver 1010, a communications manager 1015, and a transmitter 1020. The device 1005 may also include a processor. Each of these components may be in communication with one another (e.g., via one or more buses).

The receiver 1010 may receive information such as packets, user data, or control information associated with various information channels (e.g., control channels, data channels, and information related to uplink beam determination techniques for SFN communications, etc.). Information may be passed on to other components of the device 1005. The receiver 1010 may be an example of aspects of the transceiver 1320 described with reference to FIG. 13. The receiver 1010 may utilize a single antenna or a set of antennas.

The communications manager 1015 may transmit, to a UE, a SFN configuration for concurrent communications with at least the first TRP and a second TRP using a first uplink carrier in a first active BWP, where one or more of an indication of a spatial relation or a path loss reference signal of a set of available spatial relations or path loss reference signals is absent from the SFN configuration, determine one or more of a first spatial relation or a first path loss reference signal for a SFN communication from the UE based on the first active BWP and the SFN configuration, and receive one or more SFN communications from the UE via the first active BWP based on the determining. The communications manager 1015 may be an example of aspects of the communications manager 1310 described herein.

The communications manager 1015, or its sub-components, may be implemented in hardware, code (e.g., software or firmware) executed by a processor, or any combination thereof. If implemented in code executed by a processor, the functions of the communications manager 1015, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1015, or its sub-components, may be physically located at various positions, including being distributed such that portions of functions are implemented at different physical locations by one or more physical components. In some examples, the communications manager 1015, or its sub-components, may be a separate and distinct component in accordance with various aspects of the present disclosure. In some examples, the communications manager 1015, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1020 may transmit signals generated by other components of the device 1005. In some examples, the transmitter 1020 may be collocated with a receiver 1010 in a transceiver module. For example, the transmitter 1020 may be an example of aspects of the transceiver 1320 described with reference to FIG. 13. The transmitter 1020 may utilize a single antenna or a set of antennas.

Figure 11:
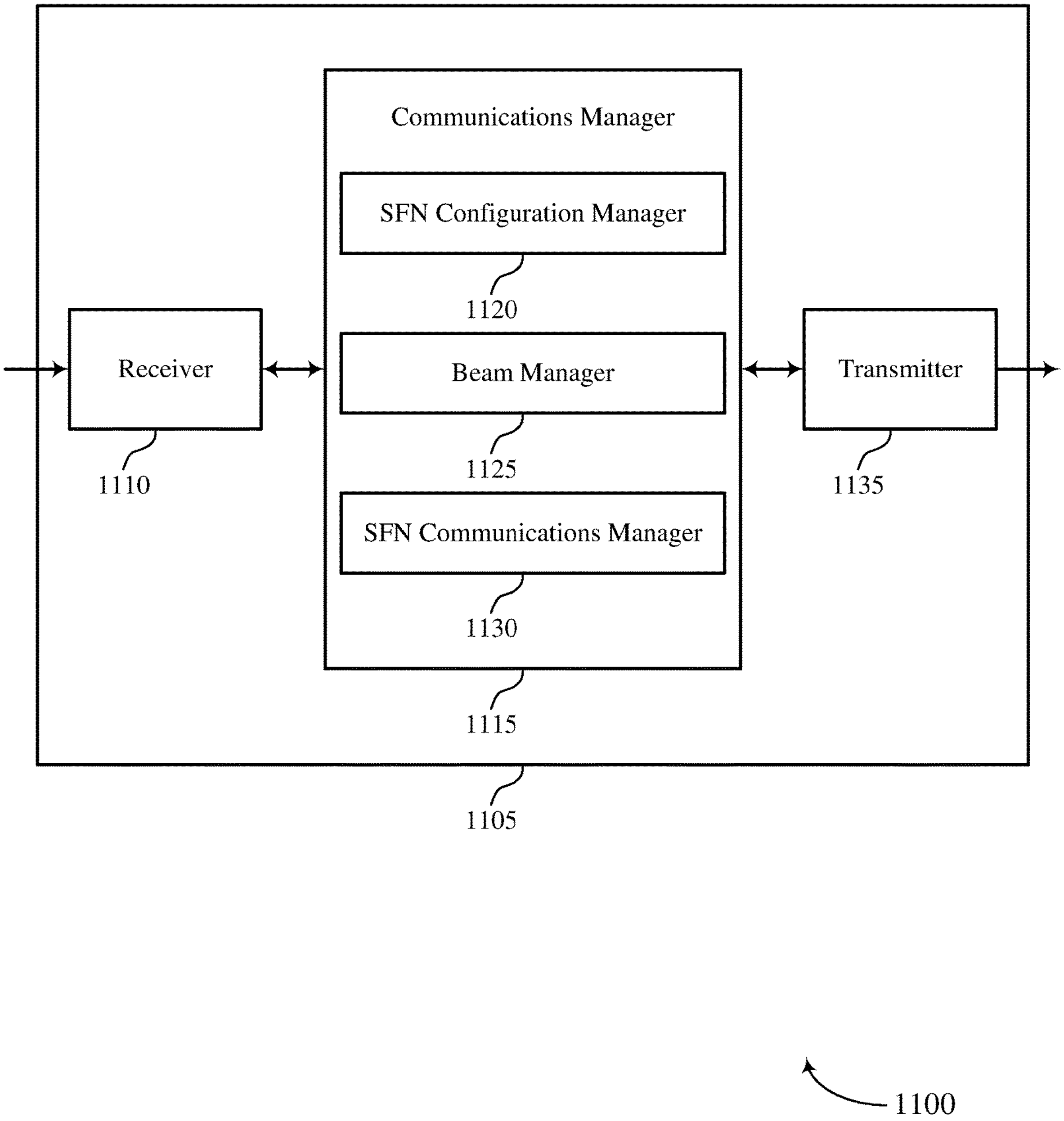

FIG. 11 shows a block diagram 1100 of a device 1105 that supports uplink beam determination techniques for SFN communications in accordance with aspects of the present disclosure. The device 1105 may be an example of aspects of a device 1005, or a base station 105 as described herein. The device 1105 may include a receiver 1110, a communications manager 1115, and a transmitter 1135. The device 1105 may also include a processor. Each of these components may be in communication with one another (e.g., via one or more buses).

The receiver 1110 may receive information such as packets, user data, or control information associated with various information channels (e.g., control channels, data channels, and information related to uplink beam determination techniques for SFN communications, etc.). Information may be passed on to other components of the device 1105. The receiver 1110 may be an example of aspects of the transceiver 1320 described with reference to FIG. 13. The receiver 1110 may utilize a single antenna or a set of antennas.

The communications manager 1115 may be an example of aspects of the communications manager 1015 as described herein. The communications manager 1115 may include a SFN configuration manager 1120, a beam manager 1125, and a SFN communications manager 1130. The communications manager 1115 may be an example of aspects of the communications manager 1310 described herein.

The SFN configuration manager 1120 may transmit, to a UE, a SFN configuration for concurrent communications with at least the first TRP and a second TRP using a first uplink carrier in a first active BWP, where one or more of an indication of a spatial relation or a path loss reference signal of a set of available spatial relations or path loss reference signals is absent from the SFN configuration.

The beam manager 1125 may determine one or more of a first spatial relation or a first path loss reference signal for a SFN communication from the UE based on the first active BWP and the SFN configuration.

The SFN communications manager 1130 may receive one or more SFN communications from the UE via the first active BWP based on the determining.

The transmitter 1135 may transmit signals generated by other components of the device 1105. In some examples, the transmitter 1135 may be collocated with a receiver 1110 in a transceiver module. For example, the transmitter 1135 may be an example of aspects of the transceiver 1320 described with reference to FIG. 13. The transmitter 1135 may utilize a single antenna or a set of antennas.

Figure 12:
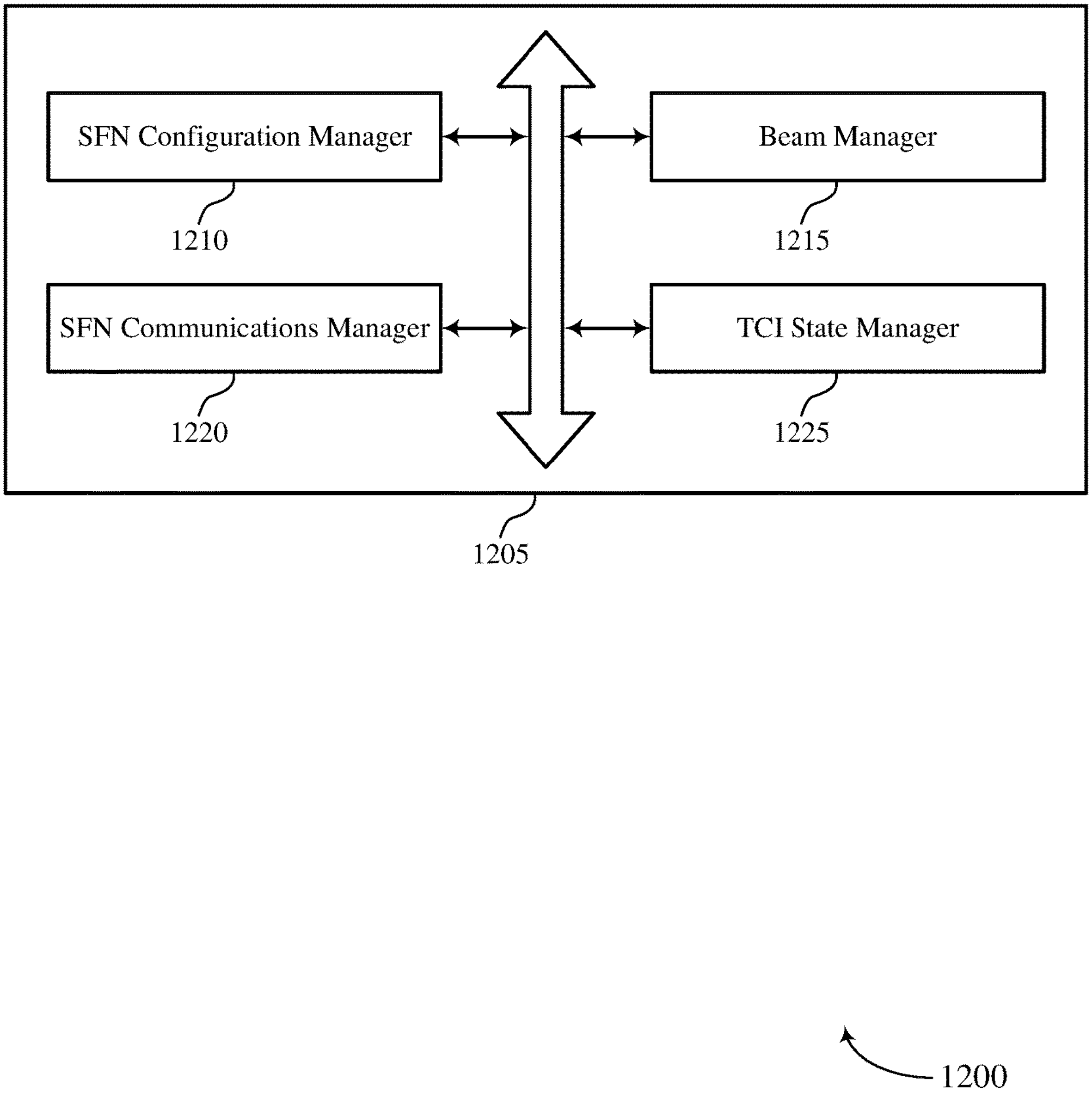
FIG. 12 shows a block diagram of a communications manager that supports uplink beam determination techniques for SFN communications in accordance with aspects of the present disclosure.

FIG. 12 shows a block diagram 1200 of a communications manager 1205 that supports uplink beam determination techniques for SFN communications in accordance with aspects of the present disclosure. The communications manager 1205 may be an example of aspects of a communications manager 1015, a communications manager 1115, or a communications manager 1310 described herein. The communications manager 1205 may include a SFN configuration manager 1210, a beam manager 1215, a SFN communications manager 1220, and a TCI state manager 1225. Each of these modules may communicate, directly or indirectly, with one another (e.g., via one or more buses).

The SFN configuration manager 1210 may transmit, to a UE, a SFN configuration for concurrent communications with at least the first TRP and a second TRP using a first uplink carrier in a first active BWP, where one or more of an indication of a spatial relation or a path loss reference signal of a set of available spatial relations or path loss reference signals is absent from the SFN configuration.

The beam manager 1215 may determine one or more of a first spatial relation or a first path loss reference signal for a SFN communication from the UE based on the first active BWP and the SFN configuration. In some examples, the beam manager 1215 may transmit, to the UE, one or more TCI states for each of a set of configured TCI codepoints or CORESETs associated with the first active BWP, each of the one or more configured TCI codepoints or CORESETs having as associated identification value.

In some examples, the beam manager 1215 may determine that a first TCI codepoint or a first CORESET having a lowest identification value is mapped to a single TCI state. In some examples, the beam manager 1215 may determine one or more of the first spatial relation or the first path loss reference signal based on the first TCI codepoint or the first CORESET.

In some examples, the beam manager 1215 may identify a set of available TCI states associated with a set of configured TCI codepoints or CORESETs of the first active BWP, where each TCI state of the set of TCI states has one or more of an associated spatial relation or an associated path loss reference signal. In some examples, the beam manager 1215 may determine a first TCI state based on a rule for TCI state selection, where the first spatial relation and the first path loss reference signal are associated with the first TCI state.

In some examples, the beam manager 1215 may determine a composite beam based on a first TCI state associated with the first TRP and a second TCI state associated with the second TRP. In some examples, the beam manager 1215 may determine one or more of the first spatial relation or the first path loss reference signal based on the composite beam.

In some examples, the beam manager 1215 may determine that a single TCI state is associated with a lowest valued TCI codepoint identification or a lowest valued CORESET identification associated with the first active BWP. In some examples, the beam manager 1215 may determine one or more of the first spatial relation or the first path loss reference signal based on the single TCI state.

The SFN communications manager 1220 may receive one or more SFN communications from the UE via the first active BWP based on the determining. In some examples, the SFN communications manager 1220 may time division multiplex the one or more SFN communications across two or more TCI states that are configured for a TCI codepoint or CORESET having a lowest associated identification value.

The TCI state manager 1225 may determine that a single TCI state is associated with a lowest valued TCI codepoint identification or a lowest valued CORESET identification associated with the first active BWP. In some examples, the TCI state manager 1225 may identify a different TCI codepoint identification or a different CORESET identification that has two or more configured TCI states. In some examples, the TCI state manager 1225 may determine, based on the different TCI codepoint identification of the different CORESET identification, a first TCI state associated with the first TRP. In some examples, the receiving includes receiving a first SFN communication from the UE based on the first TCI state, and where the UE transmits a second SFN communication to the second TRP based on the second TCI state.

In some examples, the TCI state manager 1225 may determine that two or more TCI states are associated with a lowest valued TCI codepoint identification or a lowest valued CORESET identification associated with the first active BWP. In some examples, the TCI state manager 1225 may determine, based on the two or more TCI states, a first TCI state associated with the first TRP. In some cases, the first TCI state is determined based on a lowest active TCI codepoint or CORESETs that has only one configured TCI state, a fixed selection from a set of TCI states, a relationship between one or more of a UE identification, a configured uplink resource identification, a power control loop identification, a type of reference signal associated with each of the set of TCI states, a RSRP associated with each of the set of TCI states, an expected channel quality associated with each of the set of TCI states, or any combinations thereof.

Figure 13:
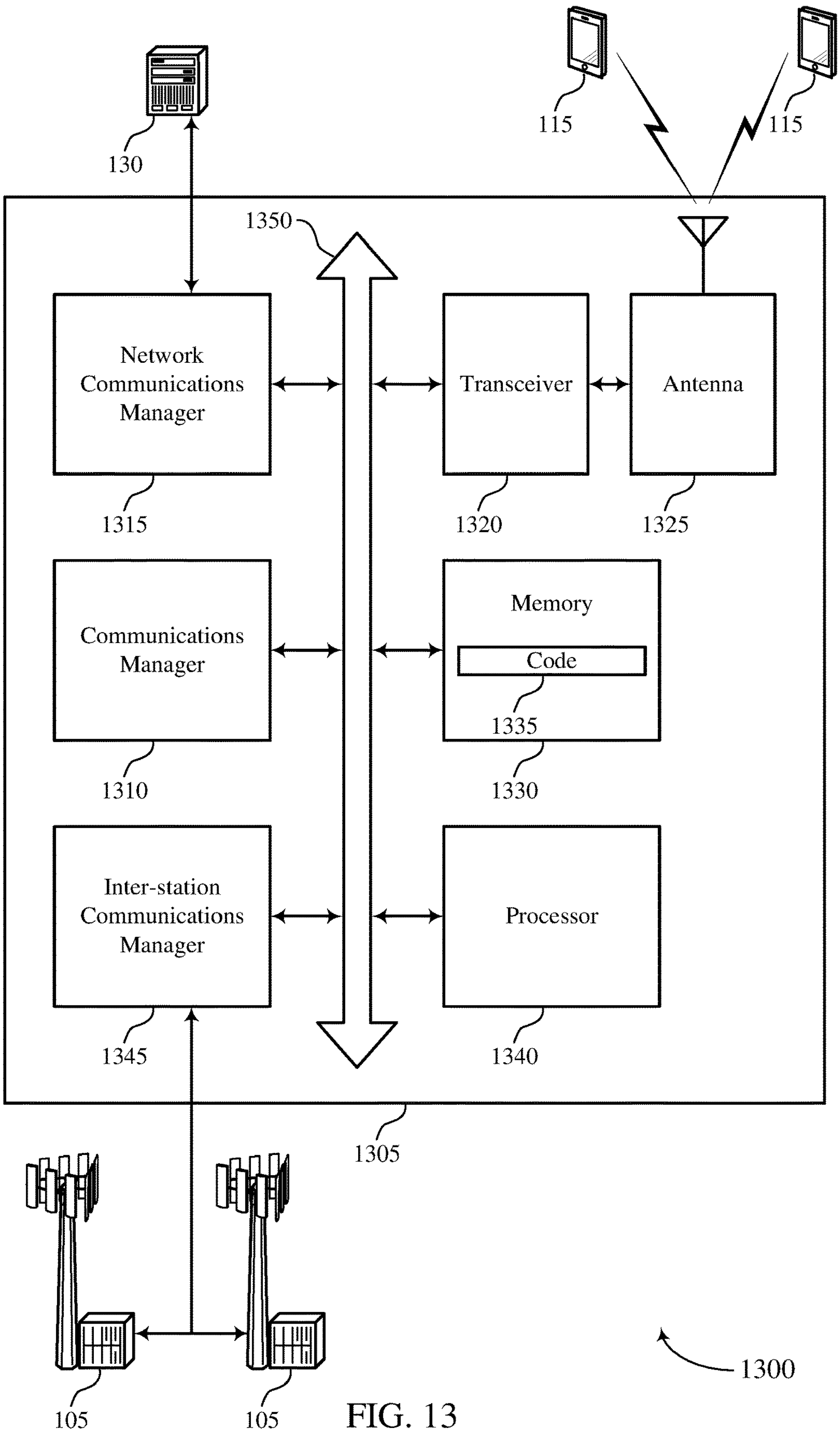
FIG. 13 shows a diagram of a system including a device that supports uplink beam determination techniques for SFN communications in accordance with aspects of the present disclosure.

FIG. 13 shows a diagram of a system 1300 including a device 1305 that supports uplink beam determination techniques for SFN communications in accordance with aspects of the present disclosure. The device 1305 may be an example of or include the components of device 1005, device 1105, or a base station 105 as described herein. The device 1305 may include components for bi-directional voice and data communications including components for transmitting and receiving communications, including a communications manager 1310, a network communications manager 1315, a transceiver 1320, an antenna 1325, memory 1330, a processor 1340, and an inter-station communications manager 1345. These components may be in electronic communication via one or more buses (e.g., bus 1350).

The communications manager 1310 may transmit, to a UE, a SFN configuration for concurrent communications with at least the first TRP and a second TRP using a first uplink carrier in a first active BWP, where one or more of an indication of a spatial relation or a path loss reference signal of a set of available spatial relations or path loss reference signals is absent from the SFN configuration, determine one or more of a first spatial relation or a first path loss reference signal for a SFN communication from the UE based on the first active BWP and the SFN configuration, and receive one or more SFN communications from the UE via the first active BWP based on the determining.

The network communications manager 1315 may manage communications with the core network (e.g., via one or more wired backhaul links). For example, the network communications manager 1315 may manage the transfer of data communications for client devices, such as one or more UEs 115.

The transceiver 1320 may communicate bi-directionally, via one or more antennas, wired, or wireless links as described above. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas.

In some cases, the wireless device may include a single antenna 1325. However, in some cases the device may have more than one antenna 1325, which may be capable of concurrently transmitting or receiving multiple wireless transmissions.

The memory 1330 may include RAM, ROM, or a combination thereof. The memory 1330 may store computer-readable code 1335 including instructions that, when executed by a processor (e.g., the processor 1340) cause the device to perform various functions described herein. In some cases, the memory 1330 may contain, among other things, a BIOS which may control basic hardware or software operation such as the interaction with peripheral components or devices.

The processor 1340 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some cases, a memory controller may be integrated into processor 1340. The processor 1340 may be configured to execute computer-readable instructions stored in a memory (e.g., the memory 1330) to cause the device 1305 to perform various functions (e.g., functions or tasks supporting uplink beam determination techniques for SFN communications).

The inter-station communications manager 1345 may manage communications with other base station 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communication network technology to provide communication between base stations 105.

The code 1335 may include instructions to implement aspects of the present disclosure, including instructions to support wireless communications. The code 1335 may be stored in a non-transitory computer-readable medium such as system memory or other type of memory. In some cases, the code 1335 may not be directly executable by the processor 1340 but may cause a computer (e.g., when compiled and executed) to perform functions described herein.

Figure 14:
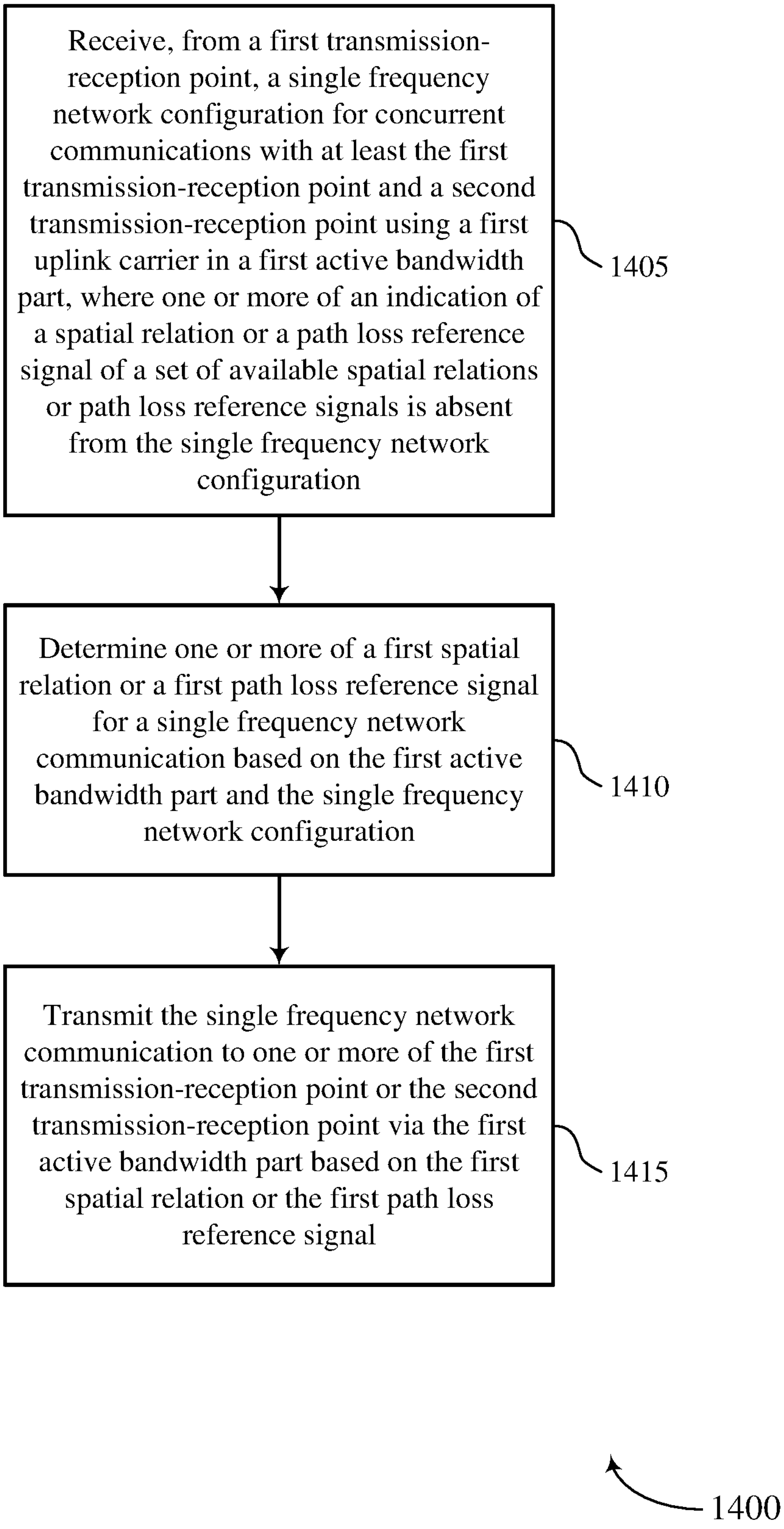
FIGS. 14 through 25 show flowcharts illustrating methods that support uplink beam determination techniques for SFN communications in accordance with aspects of the present disclosure.

FIG. 14 shows a flowchart illustrating a method 1400 that supports uplink beam determination techniques for SFN communications in accordance with aspects of the present disclosure. The operations of method 1400 may be implemented by a UE 115 or its components as described herein. For example, the operations of method 1400 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1405, the UE may receive, from a first TRP, a SFN configuration for concurrent communications with at least the first TRP and a second TRP using a first uplink carrier in a first active BWP, where one or more of an indication of a spatial relation or a path loss reference signal of a set of available spatial relations or path loss reference signals is absent from the SFN configuration. The operations of 1405 may be performed according to the methods described herein. In some examples, aspects of the operations of 1405 may be performed by a SFN configuration manager as described with reference to FIGS. 6 through 9.

At 1410, the UE may determine one or more of a first spatial relation or a first path loss reference signal for a SFN communication based on the first active BWP and the SFN configuration. The operations of 1410 may be performed according to the methods described herein. In some examples, aspects of the operations of 1410 may be performed by a beam manager as described with reference to FIGS. 6 through 9.

At 1415, the UE may transmit the SFN communication to one or more of the first TRP or the second TRP via the first active BWP based on the first spatial relation or the first path loss reference signal. The operations of 1415 may be performed according to the methods described herein. In some examples, aspects of the operations of 1415 may be performed by a SFN communications manager as described with reference to FIGS. 6 through 9.

Figure 15:
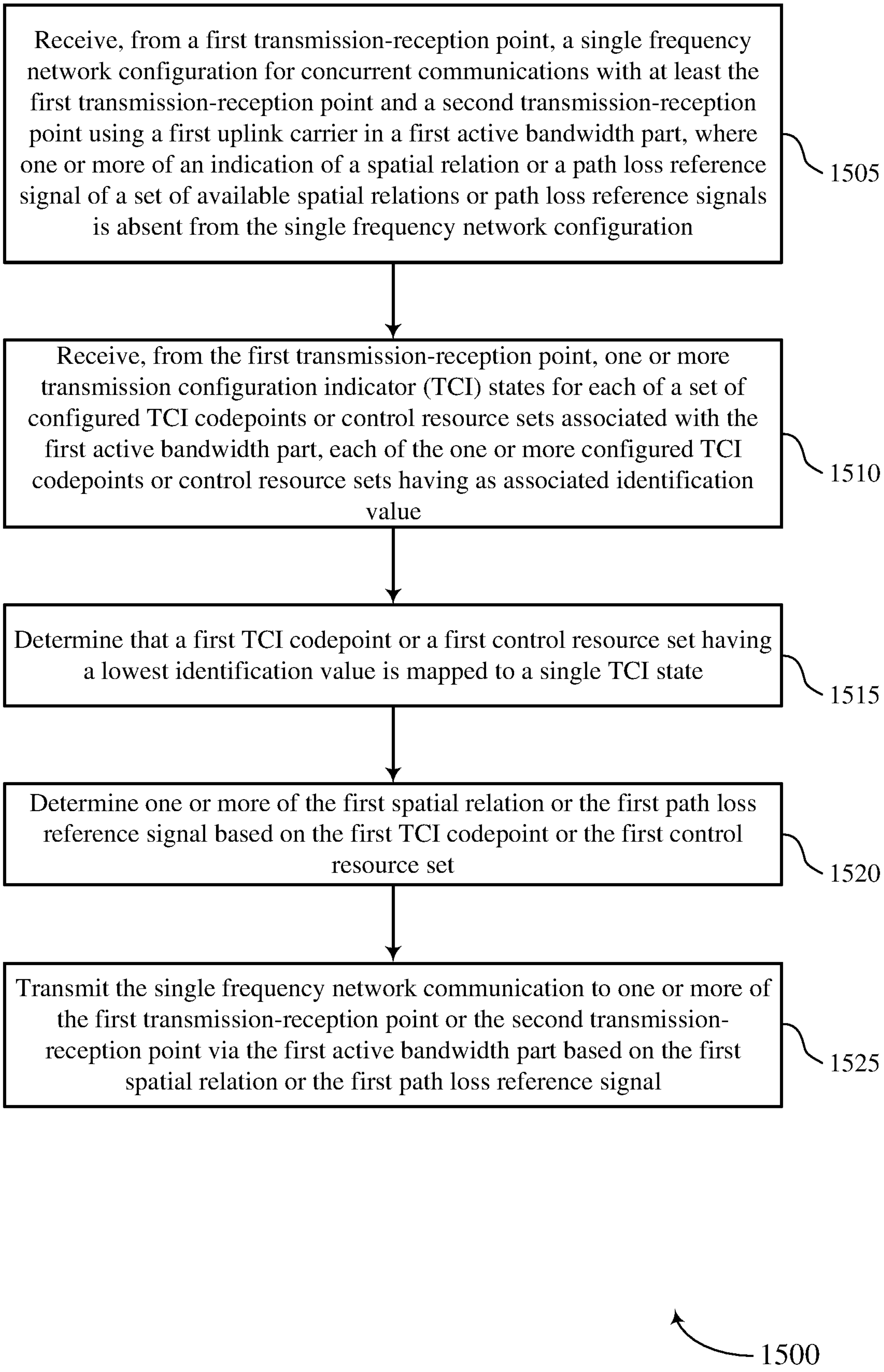

FIG. 15 shows a flowchart illustrating a method 1500 that supports uplink beam determination techniques for SFN communications in accordance with aspects of the present disclosure. The operations of method 1500 may be implemented by a UE 115 or its components as described herein. For example, the operations of method 1500 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1505, the UE may receive, from a first TRP, a SFN configuration for concurrent communications with at least the first TRP and a second TRP using a first uplink carrier in a first active BWP, where one or more of an indication of a spatial relation or a path loss reference signal of a set of available spatial relations or path loss reference signals is absent from the SFN configuration. The operations of 1505 may be performed according to the methods described herein. In some examples, aspects of the operations of 1505 may be performed by a SFN configuration manager as described with reference to FIGS. 6 through 9.

At 1510, the UE may receive, from the first TRP, one or more transmission configuration indicator (TCI) states for each of a set of configured TCI codepoints or CORESETs associated with the first active BWP, each of the one or more configured TCI codepoints or CORESETs having as associated identification value. The operations of 1510 may be performed according to the methods described herein. In some examples, aspects of the operations of 1510 may be performed by a beam manager as described with reference to FIGS. 6 through 9.

At 1515, the UE may determine that a first TCI codepoint or a first CORESET having a lowest identification value is mapped to a single TCI state. The operations of 1515 may be performed according to the methods described herein. In some examples, aspects of the operations of 1515 may be performed by a beam manager as described with reference to FIGS. 6 through 9.

At 1520, the UE may determine one or more of the first spatial relation or the first path loss reference signal based on the first TCI codepoint or the first CORESET. The operations of 1520 may be performed according to the methods described herein. In some examples, aspects of the operations of 1520 may be performed by a beam manager as described with reference to FIGS. 6 through 9.

At 1525, the UE may transmit the SFN communication to one or more of the first TRP or the second TRP via the first active BWP based on the first spatial relation or the first path loss reference signal. The operations of 1525 may be performed according to the methods described herein. In some examples, aspects of the operations of 1525 may be performed by a SFN communications manager as described with reference to FIGS. 6 through 9.

Figure 16:
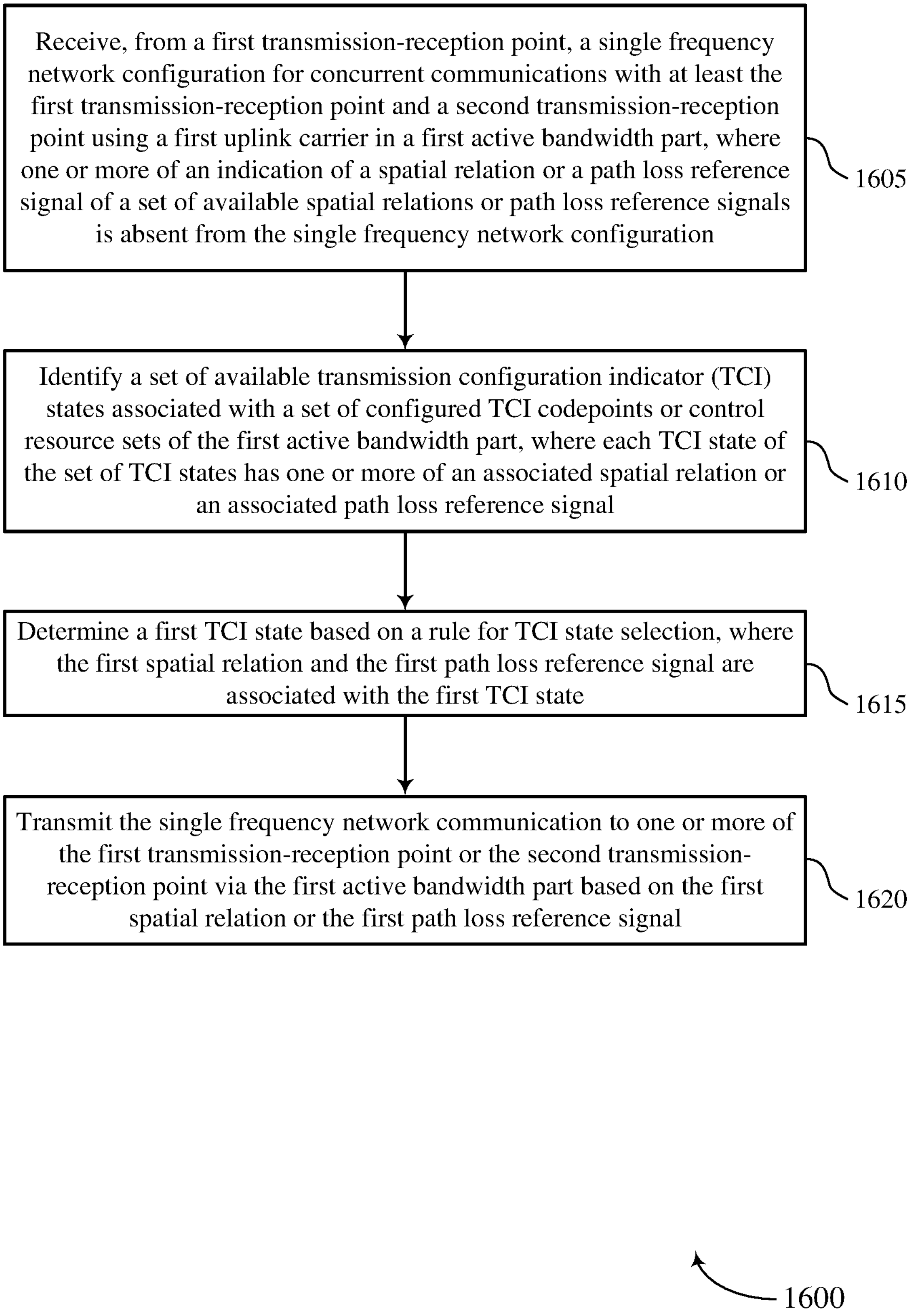

FIG. 16 shows a flowchart illustrating a method 1600 that supports uplink beam determination techniques for SFN communications in accordance with aspects of the present disclosure. The operations of method 1600 may be implemented by a UE 115 or its components as described herein. For example, the operations of method 1600 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1605, the UE may receive, from a first TRP, a SFN configuration for concurrent communications with at least the first TRP and a second TRP using a first uplink carrier in a first active BWP, where one or more of an indication of a spatial relation or a path loss reference signal of a set of available spatial relations or path loss reference signals is absent from the SFN configuration. The operations of 1605 may be performed according to the methods described herein. In some examples, aspects of the operations of 1605 may be performed by a SFN configuration manager as described with reference to FIGS. 6 through 9.

At 1610, the UE may identify a set of available transmission configuration indicator (TCI) states associated with a set of configured TCI codepoints or CORESETs of the first active BWP, where each TCI state of the set of TCI states has one or more of an associated spatial relation or an associated path loss reference signal. The operations of 1610 may be performed according to the methods described herein. In some examples, aspects of the operations of 1610 may be performed by a beam manager as described with reference to FIGS. 6 through 9.

At 1615, the UE may determine a first TCI state based on a rule for TCI state selection, where the first spatial relation and the first path loss reference signal are associated with the first TCI state. The operations of 1615 may be performed according to the methods described herein. In some examples, aspects of the operations of 1615 may be performed by a beam manager as described with reference to FIGS. 6 through 9.

At 1620, the UE may transmit the SFN communication to one or more of the first TRP or the second TRP via the first active BWP based on the first spatial relation or the first path loss reference signal. The operations of 1620 may be performed according to the methods described herein. In some examples, aspects of the operations of 1620 may be performed by a SFN communications manager as described with reference to FIGS. 6 through 9.

Figure 17:
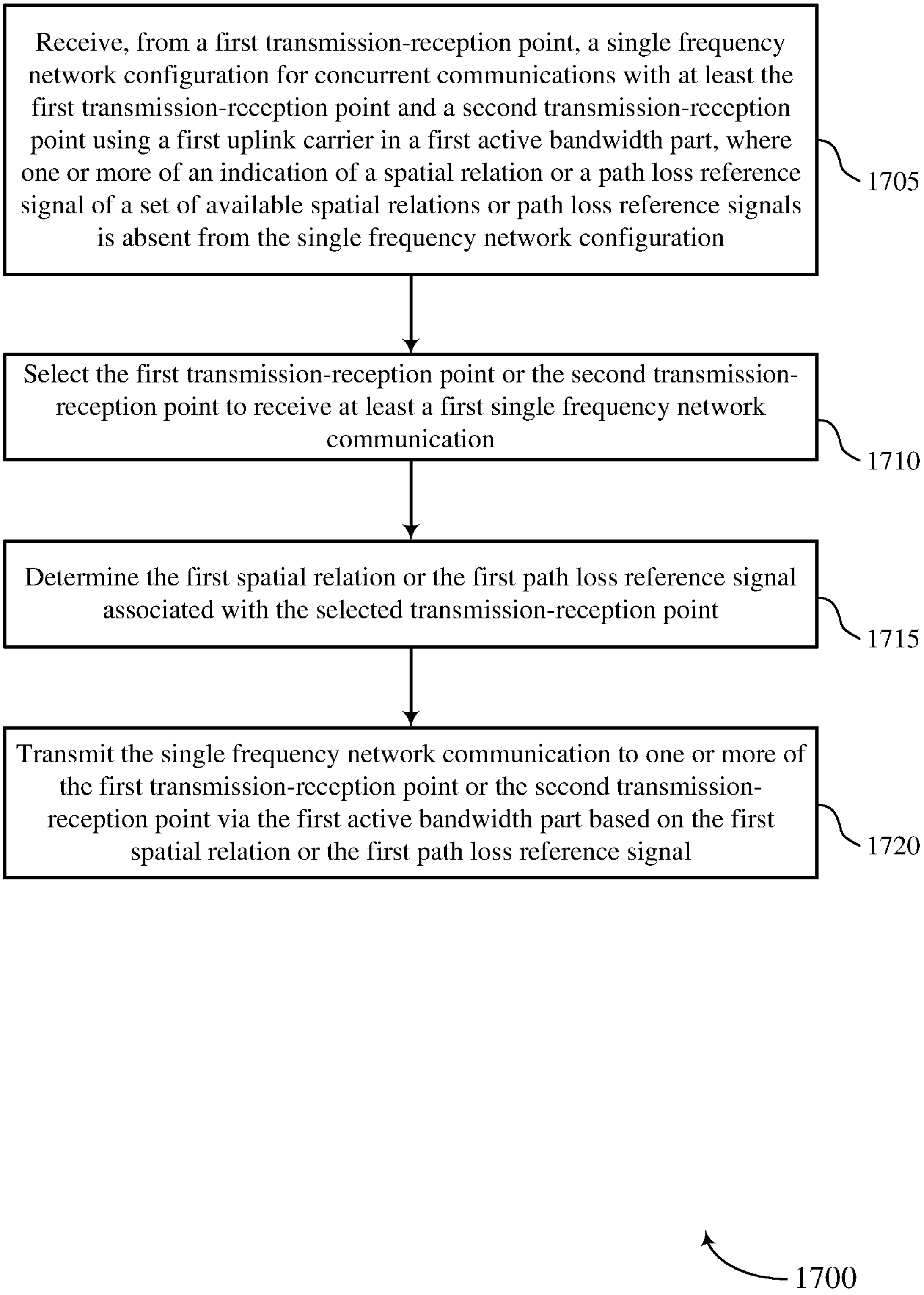

FIG. 17 shows a flowchart illustrating a method 1700 that supports uplink beam determination techniques for SFN communications in accordance with aspects of the present disclosure. The operations of method 1700 may be implemented by a UE 115 or its components as described herein. For example, the operations of method 1700 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1705, the UE may receive, from a first TRP, a SFN configuration for concurrent communications with at least the first TRP and a second TRP using a first uplink carrier in a first active BWP, where one or more of an indication of a spatial relation or a path loss reference signal of a set of available spatial relations or path loss reference signals is absent from the SFN configuration. The operations of 1705 may be performed according to the methods described herein. In some examples, aspects of the operations of 1705 may be performed by a SFN configuration manager as described with reference to FIGS. 6 through 9.

At 1710, the UE may select the first TRP or the second TRP to receive at least a first SFN communication. The operations of 1710 may be performed according to the methods described herein. In some examples, aspects of the operations of 1710 may be performed by a beam manager as described with reference to FIGS. 6 through 9.

At 1715, the UE may determine the first spatial relation or the first path loss reference signal associated with the selected TRP. The operations of 1715 may be performed according to the methods described herein. In some examples, aspects of the operations of 1715 may be performed by a beam manager as described with reference to FIGS. 6 through 9.

At 1720, the UE may transmit the SFN communication to one or more of the first TRP or the second TRP via the first active BWP based on the first spatial relation or the first path loss reference signal. The operations of 1720 may be performed according to the methods described herein. In some examples, aspects of the operations of 1720 may be performed by a SFN communications manager as described with reference to FIGS. 6 through 9.

Figure 18:
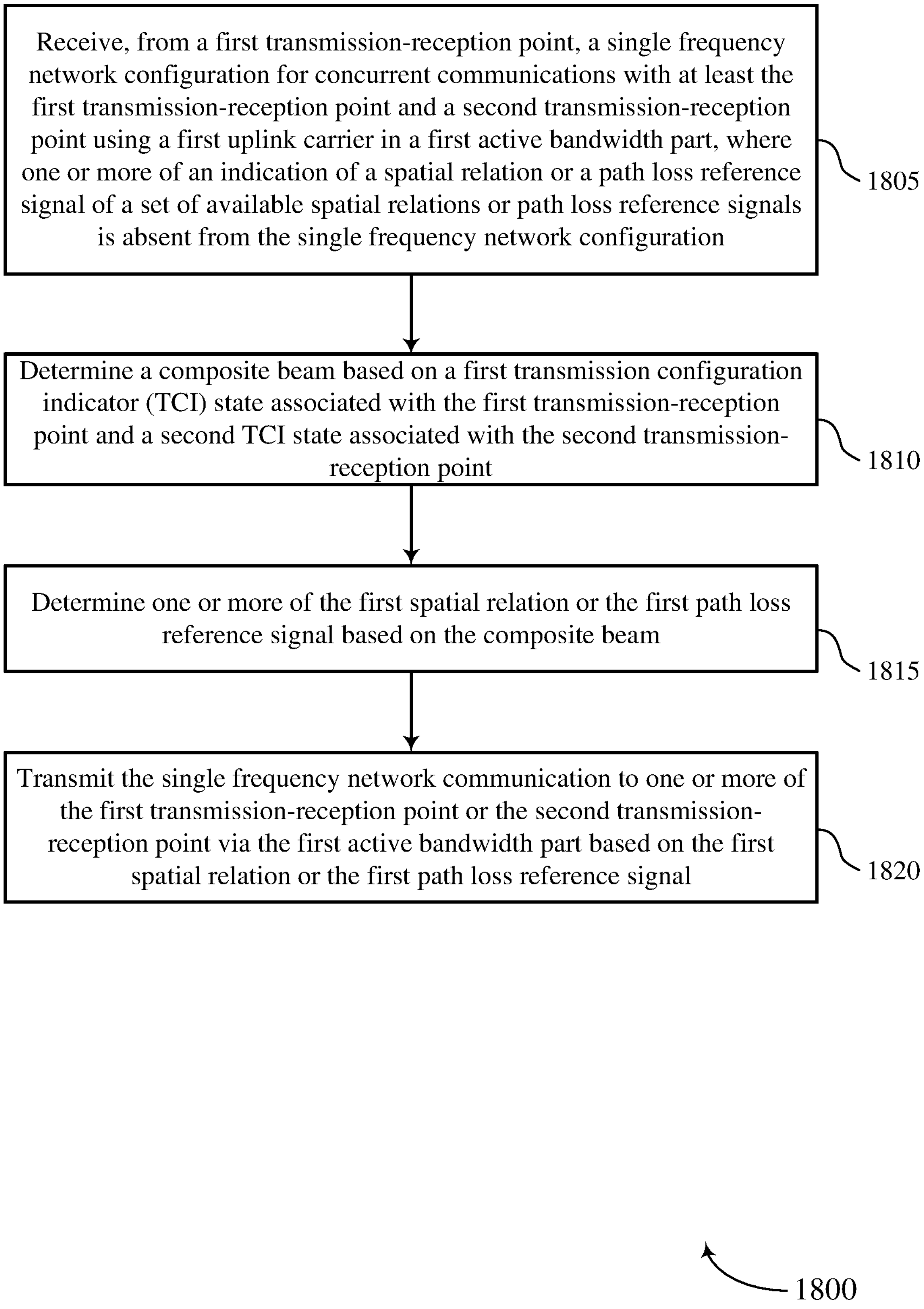

FIG. 18 shows a flowchart illustrating a method 1800 that supports uplink beam determination techniques for SFN communications in accordance with aspects of the present disclosure. The operations of method 1800 may be implemented by a UE 115 or its components as described herein. For example, the operations of method 1800 may be performed by a communications manager as described with reference to FIGS. 6 through 9. In some examples, a UE may execute a set of instructions to control the functional elements of the UE to perform the functions described below.

Additionally or alternatively, a UE may perform aspects of the functions described below using special-purpose hardware.

At 1805, the UE may receive, from a first TRP, a SFN configuration for concurrent communications with at least the first TRP and a second TRP using a first uplink carrier in a first active BWP, where one or more of an indication of a spatial relation or a path loss reference signal of a set of available spatial relations or path loss reference signals is absent from the SFN configuration. The operations of 1805 may be performed according to the methods described herein. In some examples, aspects of the operations of 1805 may be performed by a SFN configuration manager as described with reference to FIGS. 6 through 9.

At 1810, the UE may determine a composite beam based on a first transmission configuration indicator (TCI) state associated with the first TRP and a second TCI state associated with the second TRP. The operations of 1810 may be performed according to the methods described herein. In some examples, aspects of the operations of 1810 may be performed by a beam manager as described with reference to FIGS. 6 through 9.

At 1815, the UE may determine one or more of the first spatial relation or the first path loss reference signal based on the composite beam. The operations of 1815 may be performed according to the methods described herein. In some examples, aspects of the operations of 1815 may be performed by a beam manager as described with reference to FIGS. 6 through 9.

At 1820, the UE may transmit the SFN communication to one or more of the first TRP or the second TRP via the first active BWP based on the first spatial relation or the first path loss reference signal. The operations of 1820 may be performed according to the methods described herein. In some examples, aspects of the operations of 1820 may be performed by a SFN communications manager as described with reference to FIGS. 6 through 9.

Figure 19:
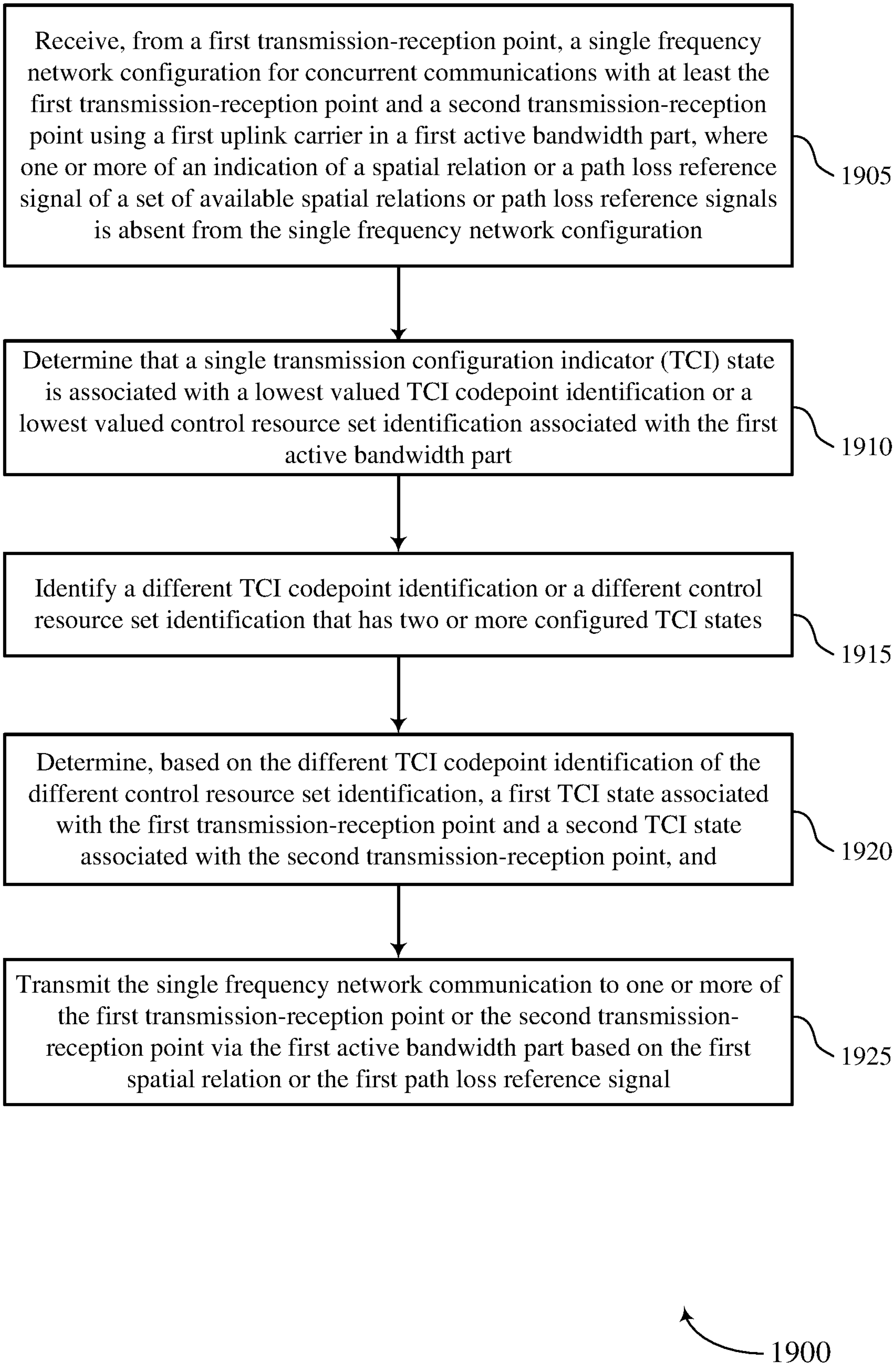

FIG. 19 shows a flowchart illustrating a method 1900 that supports uplink beam determination techniques for SFN communications in accordance with aspects of the present disclosure. The operations of method 1900 may be implemented by a UE 115 or its components as described herein. For example, the operations of method 1900 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1905, the UE may receive, from a first TRP, a SFN configuration for concurrent communications with at least the first TRP and a second TRP using a first uplink carrier in a first active BWP, where one or more of an indication of a spatial relation or a path loss reference signal of a set of available spatial relations or path loss reference signals is absent from the SFN configuration. The operations of 1905 may be performed according to the methods described herein. In some examples, aspects of the operations of 1905 may be performed by a SFN configuration manager as described with reference to FIGS. 6 through 9.

At 1910, the UE may determine that a single transmission configuration indicator (TCI) state is associated with a lowest valued TCI codepoint identification or a lowest valued CORESET identification associated with the first active BWP. The operations of 1910 may be performed according to the methods described herein. In some examples, aspects of the operations of 1910 may be performed by a TCI state manager as described with reference to FIGS. 6 through 9.

At 1915, the UE may identify a different TCI codepoint identification or a different CORESET identification that has two or more configured TCI states. The operations of 1915 may be performed according to the methods described herein. In some examples, aspects of the operations of 1915 may be performed by a TCI state manager as described with reference to FIGS. 6 through 9.

At 1920, the UE may determine, based on the different TCI codepoint identification of the different CORESET identification, a first TCI state associated with the first TRP and a second TCI state associated with the second TRP. The operations of 1920 may be performed according to the methods described herein. In some examples, aspects of the operations of 1920 may be performed by a TCI state manager as described with reference to FIGS. 6 through 9.

At 1925, the UE may transmit the SFN communication to one or more of the first TRP or the second TRP via the first active BWP based on the first spatial relation or the first path loss reference signal. The operations of 1925 may be performed according to the methods described herein. In some examples, aspects of the operations of 1925 may be performed by a SFN communications manager as described with reference to FIGS. 6 through 9. In some cases, the transmitting includes transmitting a first SFN communication to the first TRP based on the first TCI state and transmitting a second SFN communication to the second TRP based on the second TCI state.

Figure 20:
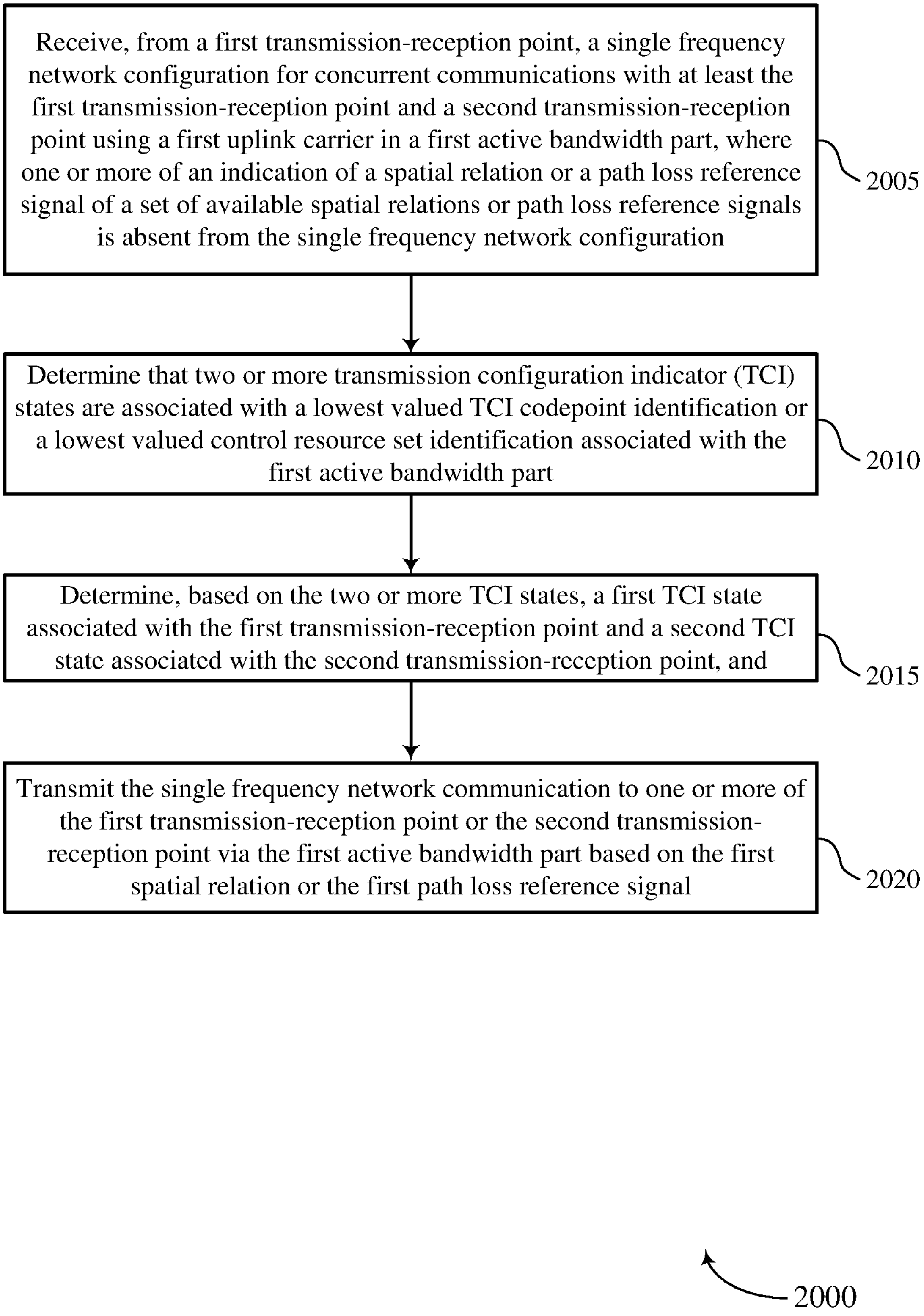

FIG. 20 shows a flowchart illustrating a method 2000 that supports uplink beam determination techniques for SFN communications in accordance with aspects of the present disclosure. The operations of method 2000 may be implemented by a UE 115 or its components as described herein. For example, the operations of method 2000 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 2005, the UE may receive, from a first TRP, a SFN configuration for concurrent communications with at least the first TRP and a second TRP using a first uplink carrier in a first active BWP, where one or more of an indication of a spatial relation or a path loss reference signal of a set of available spatial relations or path loss reference signals is absent from the SFN configuration. The operations of 2005 may be performed according to the methods described herein. In some examples, aspects of the operations of 2005 may be performed by a SFN configuration manager as described with reference to FIGS. 6 through 9.

At 2010, the UE may determine that two or more transmission configuration indicator (TCI) states are associated with a lowest valued TCI codepoint identification or a lowest valued CORESET identification associated with the first active BWP. The operations of 2010 may be performed according to the methods described herein. In some examples, aspects of the operations of 2010 may be performed by a TCI state manager as described with reference to FIGS. 6 through 9.

At 2015, the UE may determine, based on the two or more TCI states, a first TCI state associated with the first TRP and a second TCI state associated with the second TRP. The operations of 2015 may be performed according to the methods described herein. In some examples, aspects of the operations of 2015 may be performed by a TCI state manager as described with reference to FIGS. 6 through 9.

At 2020, the UE may transmit the SFN communication to one or more of the first TRP or the second TRP via the first active BWP based on the first spatial relation or the first path loss reference signal. The operations of 2020 may be performed according to the methods described herein. In some examples, aspects of the operations of 2020 may be performed by a SFN communications manager as described with reference to FIGS. 6 through 9. In some cases, the transmitting includes transmitting a first SFN communication to the first TRP based on the first TCI state and transmitting a second SFN communication to the second TRP based on the second TCI state.

Figure 21:
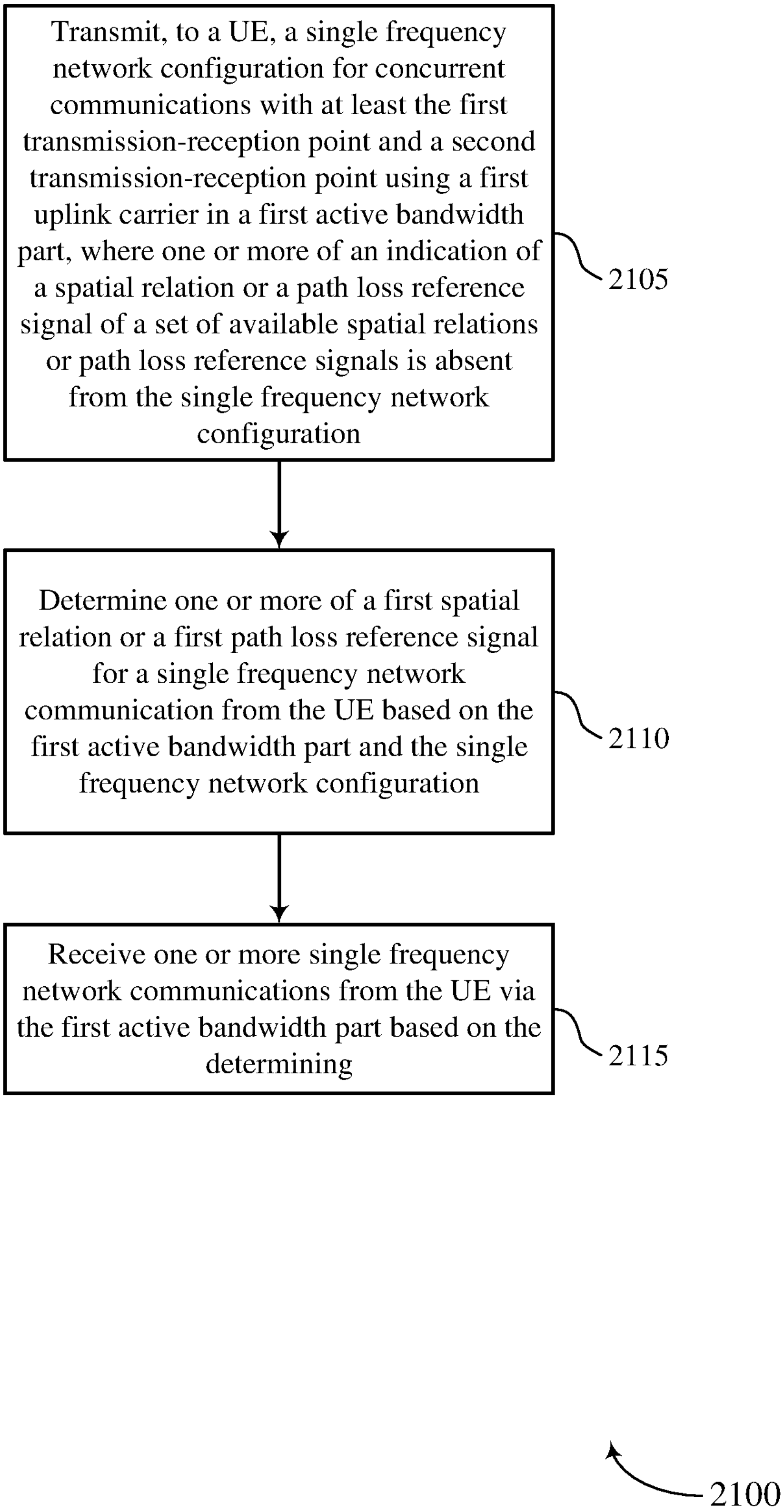

FIG. 21 shows a flowchart illustrating a method 2100 that supports uplink beam determination techniques for SFN communications in accordance with aspects of the present disclosure. The operations of method 2100 may be implemented by a base station 105 or its components as described herein. For example, the operations of method 2100 may be performed by a communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 2105, the base station may transmit, to a UE, a SFN configuration for concurrent communications with at least the first TRP and a second TRP using a first uplink carrier in a first active BWP, where one or more of an indication of a spatial relation or a path loss reference signal of a set of available spatial relations or path loss reference signals is absent from the SFN configuration. The operations of 2105 may be performed according to the methods described herein. In some examples, aspects of the operations of 2105 may be performed by a SFN configuration manager as described with reference to FIGS. 10 through 13.

At 2110, the base station may determine one or more of a first spatial relation or a first path loss reference signal for a SFN communication from the UE based on the first active BWP and the SFN configuration. The operations of 2110 may be performed according to the methods described herein. In some examples, aspects of the operations of 2110 may be performed by a beam manager as described with reference to FIGS. 10 through 13.

At 2115, the base station may receive one or more SFN communications from the UE via the first active BWP based on the determining. The operations of 2115 may be performed according to the methods described herein. In some examples, aspects of the operations of 2115 may be performed by a SFN communications manager as described with reference to FIGS. 10 through 13.

Figure 22:
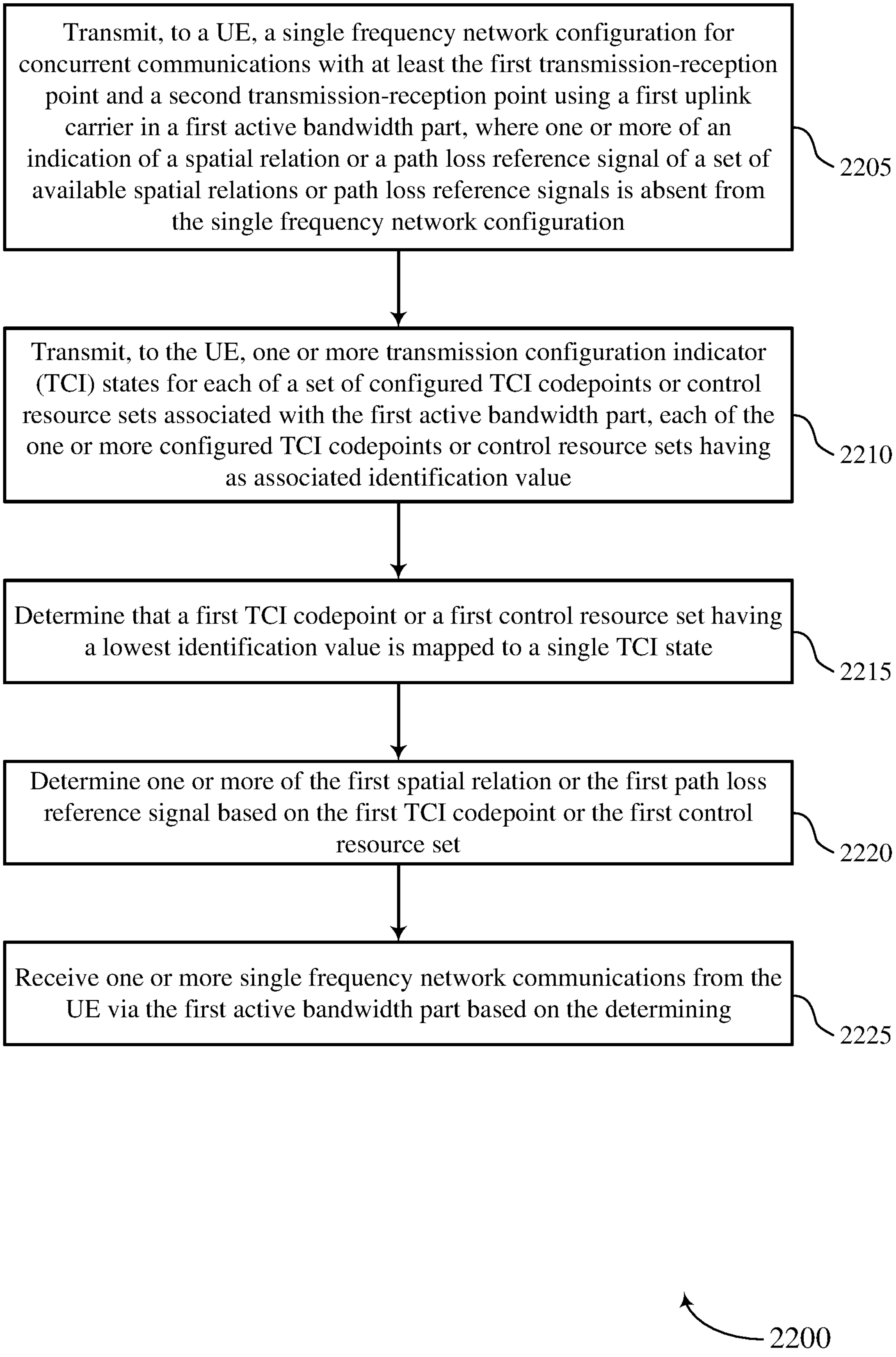

FIG. 22 shows a flowchart illustrating a method 2200 that supports uplink beam determination techniques for SFN communications in accordance with aspects of the present disclosure. The operations of method 2200 may be implemented by a base station 105 or its components as described herein. For example, the operations of method 2200 may be performed by a communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 2205, the base station may transmit, to a UE, a SFN configuration for concurrent communications with at least the first TRP and a second TRP using a first uplink carrier in a first active BWP, where one or more of an indication of a spatial relation or a path loss reference signal of a set of available spatial relations or path loss reference signals is absent from the SFN configuration. The operations of 2205 may be performed according to the methods described herein. In some examples, aspects of the operations of 2205 may be performed by a SFN configuration manager as described with reference to FIGS. 10 through 13.

At 2210, the base station may transmit, to the UE, one or more transmission configuration indicator (TCI) states for each of a set of configured TCI codepoints or CORESETs associated with the first active BWP, each of the one or more configured TCI codepoints or CORESETs having as associated identification value. The operations of 2210 may be performed according to the methods described herein. In some examples, aspects of the operations of 2210 may be performed by a beam manager as described with reference to FIGS. 10 through 13.

At 2215, the base station may determine that a first TCI codepoint or a first CORESET having a lowest identification value is mapped to a single TCI state. The operations of 2215 may be performed according to the methods described herein. In some examples, aspects of the operations of 2215 may be performed by a beam manager as described with reference to FIGS. 10 through 13.

At 2220, the base station may determine one or more of the first spatial relation or the first path loss reference signal based on the first TCI codepoint or the first CORESET. The operations of 2220 may be performed according to the methods described herein. In some examples, aspects of the operations of 2220 may be performed by a beam manager as described with reference to FIGS. 10 through 13.

At 2225, the base station may receive one or more SFN communications from the UE via the first active BWP based on the determining. The operations of 2225 may be performed according to the methods described herein. In some examples, aspects of the operations of 2225 may be performed by a SFN communications manager as described with reference to FIGS. 10 through 13.

Figure 23:
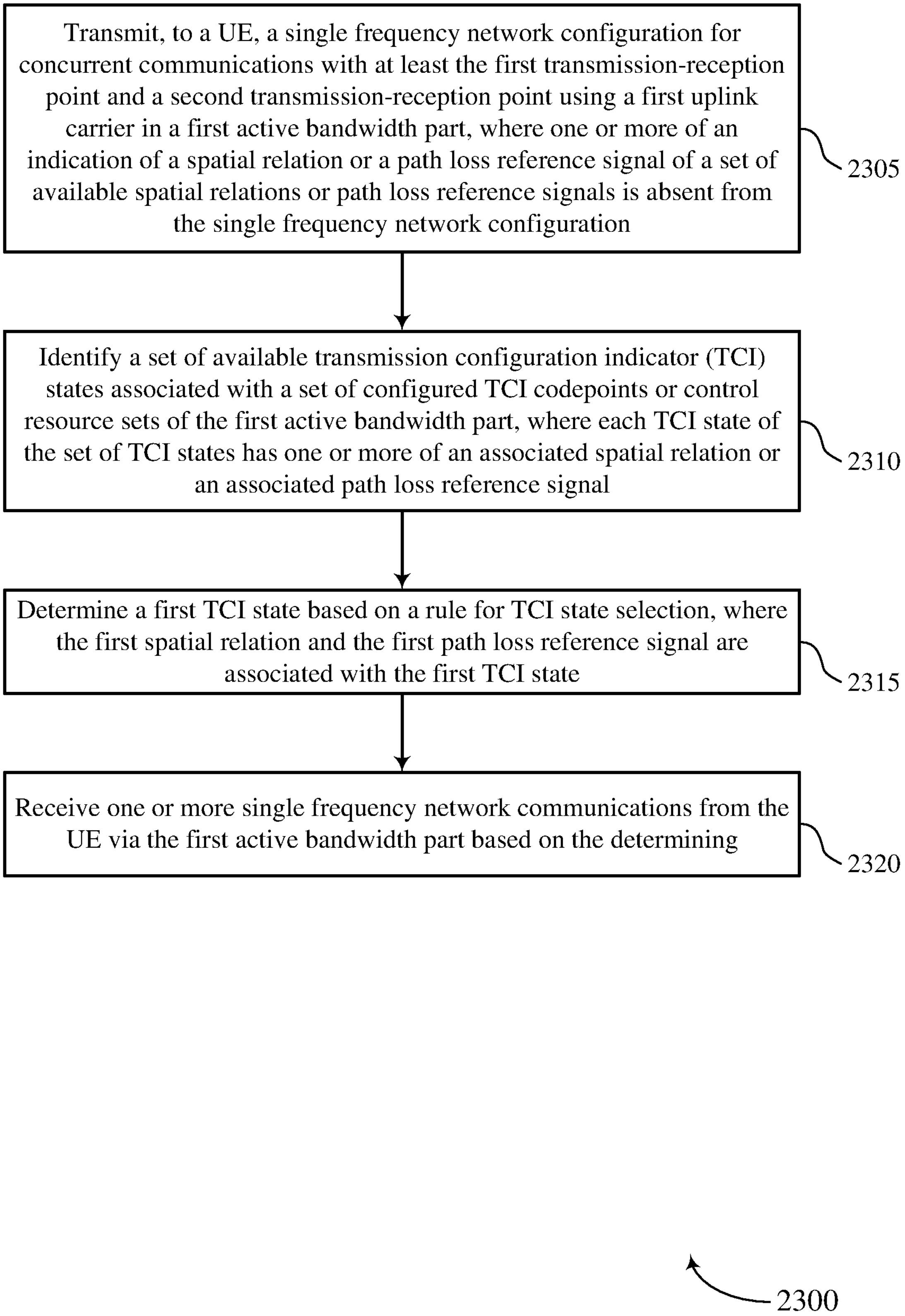

FIG. 23 shows a flowchart illustrating a method 2300 that supports uplink beam determination techniques for SFN communications in accordance with aspects of the present disclosure. The operations of method 2300 may be implemented by a base station 105 or its components as described herein. For example, the operations of method 2300 may be performed by a communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 2305, the base station may transmit, to a UE, a SFN configuration for concurrent communications with at least the first TRP and a second TRP using a first uplink carrier in a first active BWP, where one or more of an indication of a spatial relation or a path loss reference signal of a set of available spatial relations or path loss reference signals is absent from the SFN configuration. The operations of 2305 may be performed according to the methods described herein. In some examples, aspects of the operations of 2305 may be performed by a SFN configuration manager as described with reference to FIGS. 10 through 13.

At 2310, the base station may identify a set of available transmission configuration indicator (TCI) states associated with a set of configured TCI codepoints or CORESETs of the first active BWP, where each TCI state of the set of TCI states has one or more of an associated spatial relation or an associated path loss reference signal. The operations of 2310 may be performed according to the methods described herein. In some examples, aspects of the operations of 2310 may be performed by a beam manager as described with reference to FIGS. 10 through 13.

At 2315, the base station may determine a first TCI state based on a rule for TCI state selection, where the first spatial relation and the first path loss reference signal are associated with the first TCI state. The operations of 2315 may be performed according to the methods described herein. In some examples, aspects of the operations of 2315 may be performed by a beam manager as described with reference to FIGS. 10 through 13.

At 2320, the base station may receive one or more SFN communications from the UE via the first active BWP based on the determining. The operations of 2320 may be performed according to the methods described herein. In some examples, aspects of the operations of 2320 may be performed by a SFN communications manager as described with reference to FIGS. 10 through 13.

Figure 24:
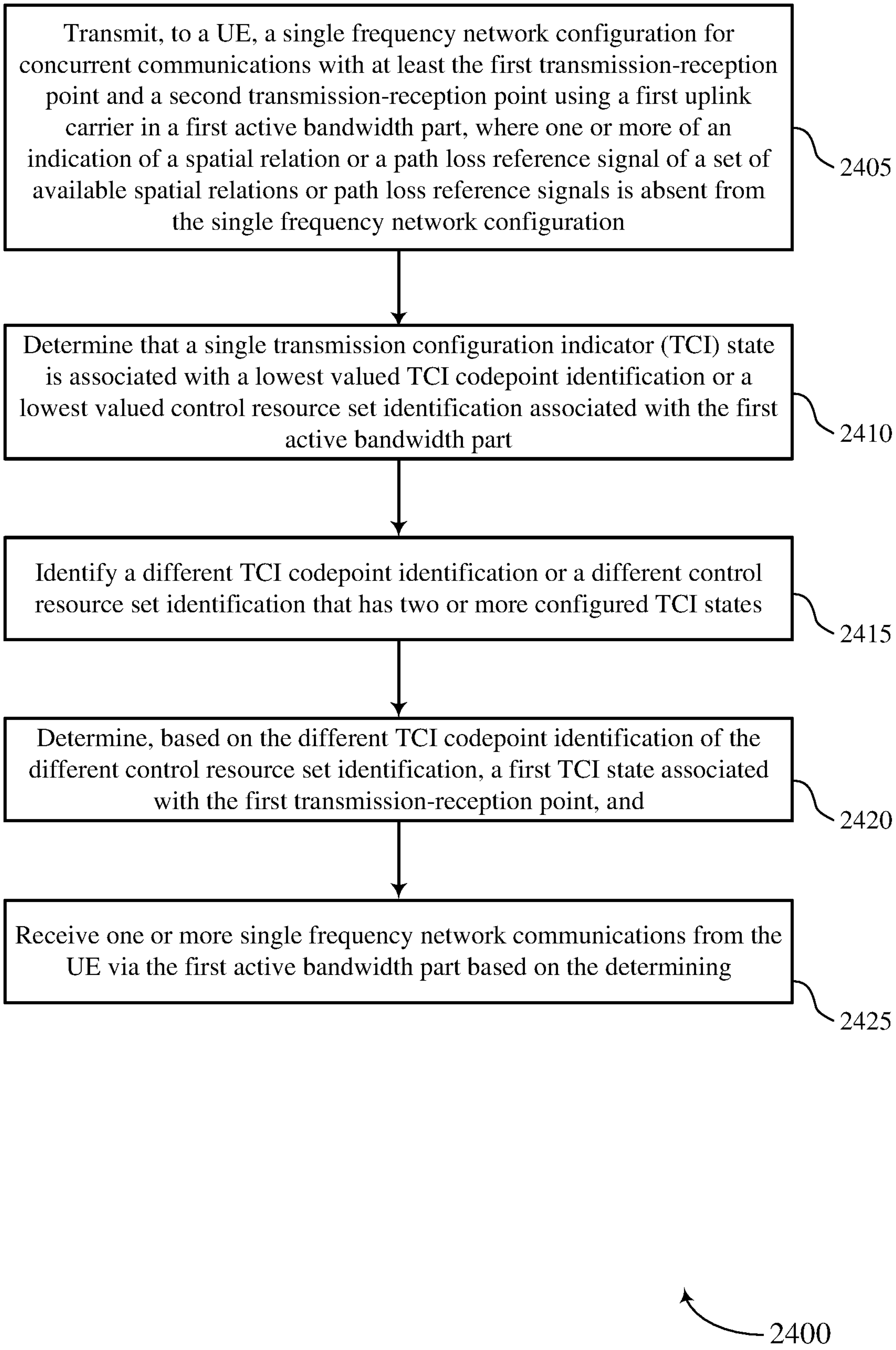

FIG. 24 shows a flowchart illustrating a method 2400 that supports uplink beam determination techniques for SFN communications in accordance with aspects of the present disclosure. The operations of method 2400 may be implemented by a base station 105 or its components as described herein. For example, the operations of method 2400 may be performed by a communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 2405, the base station may transmit, to a UE, a SFN configuration for concurrent communications with at least the first TRP and a second TRP using a first uplink carrier in a first active BWP, where one or more of an indication of a spatial relation or a path loss reference signal of a set of available spatial relations or path loss reference signals is absent from the SFN configuration. The operations of 2405 may be performed according to the methods described herein. In some examples, aspects of the operations of 2405 may be performed by a SFN configuration manager as described with reference to FIGS. 10 through 13.

At 2410, the base station may determine that a single transmission configuration indicator (TCI) state is associated with a lowest valued TCI codepoint identification or a lowest valued CORESET identification associated with the first active BWP. The operations of 2410 may be performed according to the methods described herein. In some examples, aspects of the operations of 2410 may be performed by a TCI state manager as described with reference to FIGS. 10 through 13.

At 2415, the base station may identify a different TCI codepoint identification or a different CORESET identification that has two or more configured TCI states. The operations of 2415 may be performed according to the methods described herein. In some examples, aspects of the operations of 2415 may be performed by a TCI state manager as described with reference to FIGS. 10 through 13.

At 2420, the base station may determine, based on the different TCI codepoint identification of the different CORESET identification, a first TCI state associated with the first TRP. The operations of 2420 may be performed according to the methods described herein. In some examples, aspects of the operations of 2420 may be performed by a TCI state manager as described with reference to FIGS. 10 through 13.

At 2425, the base station may receive one or more SFN communications from the UE via the first active BWP based on the determining. The operations of 2425 may be performed according to the methods described herein. In some examples, aspects of the operations of 2425 may be performed by a SFN communications manager as described with reference to FIGS. 10 through 13. In some cases, the receiving includes receiving a first SFN communication from the UE based on the first TCI state, and where the UE transmits a second SFN communication to the second TRP based on the second TCI state.

Figure 25:
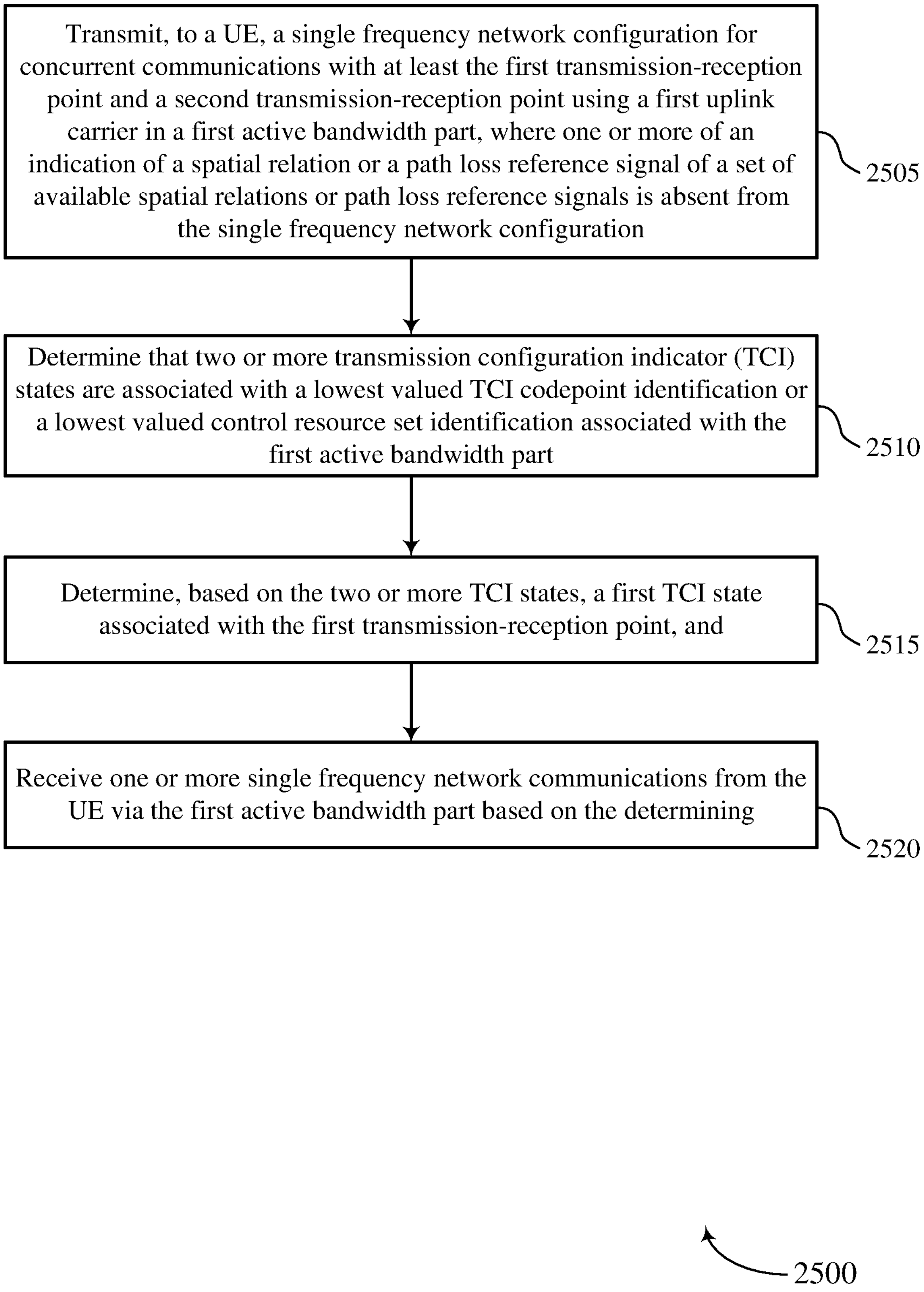

FIG. 25 shows a flowchart illustrating a method 2500 that supports uplink beam determination techniques for SFN communications in accordance with aspects of the present disclosure. The operations of method 2500 may be implemented by a base station 105 or its components as described herein. For example, the operations of method 2500 may be performed by a communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 2505, the base station may transmit, to a UE, a SFN configuration for concurrent communications with at least the first TRP and a second TRP using a first uplink carrier in a first active BWP, where one or more of an indication of a spatial relation or a path loss reference signal of a set of available spatial relations or path loss reference signals is absent from the SFN configuration. The operations of 2505 may be performed according to the methods described herein. In some examples, aspects of the operations of 2505 may be performed by a SFN configuration manager as described with reference to FIGS. 10 through 13.

At 2510, the base station may determine that two or more transmission configuration indicator (TCI) states are associated with a lowest valued TCI codepoint identification or a lowest valued CORESET identification associated with the first active BWP. The operations of 2510 may be performed according to the methods described herein. In some examples, aspects of the operations of 2510 may be performed by a TCI state manager as described with reference to FIGS. 10 through 13.

At 2515, the base station may determine, based on the two or more TCI states, a first TCI state associated with the first TRP. The operations of 2515 may be performed according to the methods described herein. In some examples, aspects of the operations of 2515 may be performed by a TCI state manager as described with reference to FIGS. 10 through 13.

At 2520, the base station may receive one or more SFN communications from the UE via the first active BWP based on the determining. The operations of 2520 may be performed according to the methods described herein. In some examples, aspects of the operations of 2520 may be performed by a SFN communications manager as described with reference to FIGS. 10 through 13. In some cases, the receiving includes receiving a first SFN communication from the UE based on the first TCI state, and where the UE transmits a second SFN communication to the second TRP based on the second TCI state.

It should be noted that the methods described herein describe possible implementations, and that the operations and the steps may be rearranged or otherwise modified and that other implementations are possible. Further, aspects from two or more of the methods may be combined.

The following examples are given by way of illustration. Aspects of the following examples may be combined with aspects or embodiments shown or discussed in relation to the figures or elsewhere herein.

Example 1 is a method of wireless communication at a UE that includes receiving, from a first transmission-reception point, a single frequency network configuration for concurrent communications with at least the first transmission-reception point and a second transmission-reception point using a first uplink carrier in a first active bandwidth part, wherein one or more of an indication of a spatial relation or a path loss reference signal of a plurality of available spatial relations or path loss reference signals is absent from the single frequency network configuration; determining one or more of a first spatial relation or a first path loss reference signal for a single frequency network communication based at least in part on the first active bandwidth part and the single frequency network configuration; and transmitting the single frequency network communication to one or more of the first transmission-reception point or the second transmission-reception point via the first active bandwidth part based at least in part on the first spatial relation or the first path loss reference signal.

In Example 2, the method of example 1 further includes receiving, from the first transmission-reception point, one or more TCI states for each of a plurality of configured TCI codepoints or control resource sets associated with the first active bandwidth part, each of the plurality of configured TCI codepoints or control resource sets having as associated identification value; determining that a first TCI codepoint or a first control resource set having a lowest identification value is mapped to a single TCI state; and determining one or more of the first spatial relation or the first path loss reference signal based at least in part on the first TCI codepoint or the first control resource set.

In Example 3, the method of example 1 further includes identifying a plurality of available TCI states associated with a plurality of configured TCI codepoints or control resource sets of the first active bandwidth part, wherein each TCI state of the plurality of TCI states has one or more of an associated spatial relation or an associated path loss reference signal; and determining a first TCI state based at least in part on a rule for TCI state selection, wherein the first spatial relation and the first path loss reference signal are associated with the first TCI state.

In Example 4, the method of example 3 may further include that the first TCI state is determined based at least in part on a lowest active TCI codepoint or control resource sets that has only one configured TCI state.

In Example 5, the method of any of examples 3 through 4 may further include that the first TCI state is determined based at least in part on one or more of: a fixed selection from a plurality of TCI states, a relationship between one or more of a UE identification, a configured uplink resource identification, a power control loop identification, or any combinations thereof, a type of reference signal associated with each of the plurality of TCI states, a reference signal received power associated with each of the plurality of TCI states, an expected channel quality associated with each of the plurality of TCI states, or any combinations thereof.

In Example 6, the method of any of examples 3 through 5 may further include time division multiplexing the one or more single frequency network communications across two or more TCI states that are configured for a TCI codepoint or control resource set having a lowest associated identification value.

In Example 7, the method of example 1 may further include selecting the first transmission-reception point or the second transmission-reception point to receive at least a first single frequency network communication; and determining the first spatial relation or the first path loss reference signal associated with the selected transmission-reception point.

In Example 8, the method of example 1 may further include determining a composite beam based at least in part on a first TCI state associated with the first transmission-reception point and a second TCI state associated with the second transmission-reception point; and determining one or more of the first spatial relation or the first path loss reference signal based at least in part on the composite beam.

In Example 9, the method of example 1 may further include determining that a single TCI state is associated with a lowest valued TCI codepoint identification or a lowest valued control resource set identification associated with the first active bandwidth part; and determining one or more of the first spatial relation or the first path loss reference signal based at least in part on the single TCI state.

In Example 10, in the method of any of examples 1 through 9, the determining may include determining that a single TCI state is associated with a lowest valued TCI codepoint identification or a lowest valued control resource set identification associated with the first active bandwidth part; identifying a different TCI codepoint identification or a different control resource set identification that has two or more configured TCI states; determining, based at least in part on the different TCI codepoint identification of the different control resource set identification, a first TCI state associated with the first transmission-reception point and a second TCI state associated with the second transmission-reception point; and where the transmitting comprises transmitting a first single frequency network communication to the first transmission-reception point based on the first TCI state and transmitting a second single frequency network communication to the second transmission-reception point based on the second TCI state.

In Example 11, the method of example 1 further includes determining that two or more TCI states are associated with a lowest valued TCI codepoint identification or a lowest valued control resource set identification associated with the first active bandwidth part; determining, based at least in part on the two or more TCI states, a first TCI state associated with the first transmission-reception point and a second TCI state associated with the second transmission-reception point; and where the transmitting comprises transmitting a first single frequency network communication to the first transmission-reception point based on the first TCI state and transmitting a second single frequency network communication to the second transmission-reception point based on the second TCI state.

Example 12 is a system or apparatus including means for implementing a method or realizing an apparatus as in any of examples 1-11.

Example 13 is a non-transitory computer-readable medium storing instructions executable by one or more processors to cause the one or more processors to implement a method as in any of examples 1-11.

Example 14 is a system including one or more processors and memory in electronic communication with the one or more processors storing instructions executable by the one or more processors to cause the system or apparatus to implement a method as in any of examples 1-11.

Example 15 is a method of wireless communication at a first TRP that includes transmitting, to a UE, a single frequency network configuration for concurrent communications with at least the first transmission-reception point and a second transmission-reception point using a first uplink carrier in a first active bandwidth part, wherein one or more of an indication of a spatial relation or a path loss reference signal of a plurality of available spatial relations or path loss reference signals is absent from the single frequency network configuration; determining one or more of a first spatial relation or a first path loss reference signal for a single frequency network communication from the UE based at least in part on the first active bandwidth part and the single frequency network configuration; and receiving one or more single frequency network communications from the UE via the first active bandwidth part based at least in part on the determining.

In Example 16, the method of example 15 further includes transmitting, to the UE, one or more TCI states for each of a plurality of configured TCI codepoints or control resource sets associated with the first active bandwidth part, each of the plurality of configured TCI codepoints or control resource sets having as associated identification value; determining that a first TCI codepoint or a first control resource set having a lowest identification value is mapped to a single TCI state; and determining one or more of the first spatial relation or the first path loss reference signal based at least in part on the first TCI codepoint or the first control resource set.

In Example 17, the method of any of examples 15-16 further includes identifying a plurality of available TCI states associated with a plurality of configured TCI codepoints or control resource sets of the first active bandwidth part, wherein each TCI state of the plurality of TCI states has one or more of an associated spatial relation or an associated path loss reference signal; and determining a first TCI state based at least in part on a rule for TCI state selection, wherein the first spatial relation and the first path loss reference signal are associated with the first TCI state.

In Example 18, the method of example 17 further includes that the first TCI state is determined based at least in part on a lowest active TCI codepoint or control resource sets that has only one configured TCI state.

In Example 19, the method of any of examples 16-18 further include that the first TCI state is determined based at least in part on one or more of: a fixed selection from a plurality of TCI states, a relationship between one or more of a UE identification, a configured uplink resource identification, a power control loop identification, or any combinations thereof, a type of reference signal associated with each of the plurality of TCI states, a reference signal received power associated with each of the plurality of TCI states, an expected channel quality associated with each of the plurality of TCI states, or any combinations thereof.

In Example 20, the method of any of examples 15-19 further include time division multiplexing the one or more single frequency network communications across two or more TCI states that are configured for a TCI codepoint or control resource set having a lowest associated identification value.

In Example 21, the method of any of examples 15-20 further include determining a composite beam based at least in part on a first TCI state associated with the first transmission-reception point and a second TCI state associated with the second transmission-reception point; and determining one or more of the first spatial relation or the first path loss reference signal based at least in part on the composite beam.

In Example 22, the method of example 15 further includes determining that a single TCI state is associated with a lowest valued TCI codepoint identification or a lowest valued control resource set identification associated with the first active bandwidth part; and determining one or more of the first spatial relation or the first path loss reference signal based at least in part on the single TCI state.

In Example 23, the method of example 22 further includes identifying a different TCI codepoint identification or a different control resource set identification that has two or more configured TCI states; determining, based at least in part on the different TCI codepoint identification of the different control resource set identification, a first TCI state associated with the first transmission-reception point; and where the receiving comprises receiving a first single frequency network communication from the UE based on the first TCI state, and wherein the UE transmits a second single frequency network communication to the second transmission-reception point based on the second TCI state.

In Example 24, the method of example 15 further includes determining that two or more TCI states are associated with a lowest valued TCI codepoint identification or a lowest valued control resource set identification associated with the first active bandwidth part; determining, based at least in part on the two or more TCI states, a first TCI state associated with the first transmission-reception point; and where the receiving comprises receiving a first single frequency network communication from the UE based on the first TCI state, and wherein the UE transmits a second single frequency network communication to the second transmission-reception point based on the second TCI state.

Example 25 is a system or apparatus including means for implementing a method or realizing an apparatus as in any of examples 15-24.

Example 26 is a non-transitory computer-readable medium storing instructions executable by one or more processors to cause the one or more processors to implement a method as in any of examples 15-24.

Example 27 is a system including one or more processors and memory in electronic communication with the one or more processors storing instructions executable by the one or more processors to cause the system or apparatus to implement a method as in any of examples 15-24.

Aspects of these examples may be combined with aspects or embodiments disclosed in other implementations.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:

receiving, from a first transmission-reception point, a single frequency network configuration for concurrent communications with at least the first transmission-reception point and a second transmission-reception point using a first uplink carrier in a first active bandwidth part, wherein an indication of a spatial relation is absent from the single frequency network configuration, an indication of a path loss reference signal is absent from the single frequency network configuration, or both;

determining that a control resource set with a lowest identification is indicated with two or more transmission configuration indication (TCI) states;

determining one or more of a first spatial relation or a first path loss reference signal for a single frequency network communication based at least in part on a first TCI state of the two or more TCI states indicated for the control resource set with the lowest identification; and transmitting the single frequency network communication to the first transmission-reception point and the second transmission-reception point via the first active bandwidth part based at least in part on the first spatial relation or the first path loss reference signal.

2. The method of claim 1, wherein the determining comprises:

identifying a plurality of TCI states associated with a plurality of configured TCI codepoints or control resource sets of the first active bandwidth part, wherein each TCI state of the plurality of TCI states has one or more of an associated spatial relation or an associated path loss reference signal; and determining the first TCI state based at least in part on a rule for TCI state selection, wherein the first spatial relation and the first path loss reference signal are associated with the first TCI state.

3. The method of claim 2, wherein the first TCI state is determined based at least in part on one or more of:

a fixed selection from the plurality of TCI states, a relationship between one or more of a UE identification, a configured uplink resource identification, a power control loop identification, or any combinations thereof, a type of reference signal associated with each of the plurality of TCI states, a reference signal received power associated with each of the plurality of TCI states, an expected channel quality associated with each of the plurality of TCI states, or any combinations thereof.

4. The method of claim 1, wherein the determining comprises:

determining a composite beam based at least in part on the first TCI state associated with the first transmission-reception point and a second TCI state associated with the second transmission-reception point; and determining one or more of the first spatial relation or the first path loss reference signal based at least in part on the composite beam.

5. An apparatus for wireless communication at a user equipment (UE), comprising:

one or more memories storing processor-executable code; and one or more processors coupled with the one or more memories and individually or collectively operable to execute the code to cause the apparatus to:

receive, from a first transmission-reception point, a single frequency network configuration for concurrent communications with at least the first transmission-reception point and a second transmission-reception point using a first uplink carrier in a first active bandwidth part, wherein an indication of a spatial relation is absent from the single frequency network configuration, an indication of a path loss reference signal is absent from the single frequency network configuration, or both;

determine that a control resource set with a lowest identification is indicated with two or more transmission configuration indication (TCI) states;

determine one or more of a first spatial relation or a first path loss reference signal for a single frequency network communication based at least in part on a first TCI state of the two or more TCI states indicated for the control resource set with the lowest identification; and transmit the single frequency network communication to the first transmission-reception point and the second transmission-reception point via the first active bandwidth part based at least in part on the first spatial relation or the first path loss reference signal.

6. The apparatus of claim 5, wherein the one or more processors are individually or collectively further operable to execute the code to cause the apparatus to:

identify a plurality of TCI states associated with a plurality of configured TCI codepoints or control resource sets of the first active bandwidth part, wherein each TCI state of the plurality of TCI states has one or more of an associated spatial relation or an associated path loss reference signal; and determine the first TCI state based at least in part on a rule for TCI state selection, wherein the first spatial relation and the first path loss reference signal are associated with the first TCI state.

7. The apparatus of claim 6, wherein:

a fixed selection from the plurality of TCI states, a relationship between one or more of a UE identification, a configured uplink resource identification, a power control loop identification, or any combinations thereof, a type of reference signal associated with each of the plurality of TCI states, a reference signal received power associated with each of the plurality of TCI states, an expected channel quality associated with each of the plurality of TCI states, or any combinations thereof.

8. The apparatus of claim 5, wherein the one or more processors are individually or collectively further operable to execute the code to cause the apparatus to:

determine a composite beam based at least in part on the first TCI state associated with the first transmission-reception point and a second TCI state associated with the second transmission-reception point; and determine one or more of the first spatial relation or the first path loss reference signal based at least in part on the composite beam.

* * * * *